(12) United States Patent
Ghouti et al.

(10) Patent No.: US 8,385,541 B2
(45) Date of Patent: Feb. 26, 2013

(54) METHOD OF PERFORMING ELLIPTIC POLYNOMIAL CRYPTOGRAPHY WITH ELLIPTIC POLYNOMIAL HOPPING

(75) Inventors: Lahouari Ghouti, Dhahran (SA); Mohammad K. Ibrahim, Leicester (GB); Adnan A. Gutub, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 527 days.

(21) Appl. No.: 12/656,899

(22) Filed: Feb. 18, 2010

(65) Prior Publication Data

US 2011/0200185 A1 Aug. 18, 2011

(51) Int. Cl.
*H04L 9/28* (2006.01)
*H04L 9/30* (2006.01)
*H04K 1/02* (2006.01)

(52) U.S. Cl. .............. 380/30; 380/28; 380/43; 380/46
(58) Field of Classification Search .............. 380/28, 380/30, 43, 46
See application file for complete search history.

(56) References Cited

U.S. PATENT DOCUMENTS

| | | | |
|---|---|---|---|
| 4,200,770 A | 4/1980 | Hellman et al. | |
| 4,424,414 A | 1/1984 | Hellman et al. | |
| 4,668,103 A | 5/1987 | Wilson | |
| 4,995,082 A | 2/1991 | Schnorr | |
| 5,010,573 A | 4/1991 | Musyck et al. | |
| 5,054,066 A | 10/1991 | Riek et al. | |
| 5,146,500 A | 9/1992 | Maurer | |
| 5,150,411 A | 9/1992 | Maurer | |
| 5,272,755 A | 12/1993 | Miyaji et al. | |
| 5,651,069 A | 7/1997 | Rogaway | |
| 5,892,829 A | 4/1999 | Aiello et al. | |
| 6,128,737 A | 10/2000 | Jakubowski et al. | |
| 6,307,935 B1 * | 10/2001 | Crandall et al. | 380/28 |
| 6,816,594 B1 | 11/2004 | Okeya | |
| 6,876,745 B1 | 4/2005 | Kurumatani | |
| 7,050,580 B1 | 5/2006 | Ferre Herrero | |
| 7,190,787 B1 | 3/2007 | Graunke et al. | |
| 7,308,469 B2 | 12/2007 | Harley et al. | |
| 7,319,751 B2 | 1/2008 | Kirichenko | |

(Continued)

FOREIGN PATENT DOCUMENTS

| | | |
|---|---|---|
| EP | 0874307 | 10/1998 |
| EP | 0892520 | 1/1999 |

(Continued)

OTHER PUBLICATIONS

Chevassut, Olivier et al. "The Twist-AUgmented Technique for Key Exchange", 2006.*

(Continued)

*Primary Examiner* — Michael Simitoski
(74) *Attorney, Agent, or Firm* — Richard C. Litman

(57) ABSTRACT

The method of performing elliptic polynomial cryptography with elliptic polynomial hopping allows for the encryption of messages through elliptic polynomial cryptography, i.e., using elliptic polynomials with multi x-coordinates, and particularly with the utilization of elliptic polynomial hopping based upon both the elliptic polynomial and its twist, regardless of whether the elliptic polynomial and its twist are isomorphic with respect to one another. Each plaintext block is encrypted by a different elliptic polynomial, and the elliptic polynomials used are selected by an initial secret key and a random number generator. The method is particularly useful for symmetric encryption systems, and provides a block cipher fundamentally based upon a computationally hard problem.

3 Claims, 1 Drawing Sheet

U.S. PATENT DOCUMENTS

| | | |
|---|---|---|
| 7,483,533 B2 | 1/2009 | Ibrahim |
| 7,483,534 B2 | 1/2009 | Ibrahim |
| 2003/0072443 A1 | 4/2003 | Harley et al. |
| 2003/0108196 A1 | 6/2003 | Kirichenko |
| 2004/0091105 A1 | 5/2004 | Kim et al. |
| 2004/0223609 A1 | 11/2004 | Wu |
| 2006/0029220 A1 | 2/2006 | Ibrahim |
| 2006/0029221 A1 | 2/2006 | Ibrahim |
| 2006/0098814 A1 | 5/2006 | Al-Khoraidly et al. |
| 2008/0080710 A1 | 4/2008 | Harley et al. |
| 2008/0215658 A1 | 9/2008 | Gura et al. |
| 2009/0136022 A1 | 5/2009 | Langendoerfer et al. |
| 2010/0166174 A1* | 7/2010 | Ghouti et al. ............... 380/28 |
| 2010/0166175 A1* | 7/2010 | Ghouti et al. ............... 380/28 |
| 2010/0166176 A1* | 7/2010 | Ghouti et al. ............... 380/29 |
| 2010/0169644 A1* | 7/2010 | Ghouti et al. ............... 713/169 |
| 2010/0177890 A1* | 7/2010 | Ghouti et al. ............... 380/30 |
| 2010/0208884 A1* | 8/2010 | Joye ............... 380/28 |
| 2011/0200187 A1* | 8/2011 | Ghouti et al. ............... 380/43 |
| 2011/0200188 A1* | 8/2011 | Ghouti et al. ............... 380/43 |
| 2011/0274269 A1* | 11/2011 | Icart ............... 380/28 |

FOREIGN PATENT DOCUMENTS

| | | |
|---|---|---|
| EP | 1215642 | 6/2002 |
| WO | WO 9904332 | 1/1999 |

OTHER PUBLICATIONS

Johnson, Don and Alfred Menezes. "The Elliptic Curve Digital Signature Algorithm (ECDSA)", Feb. 2000.*

* cited by examiner

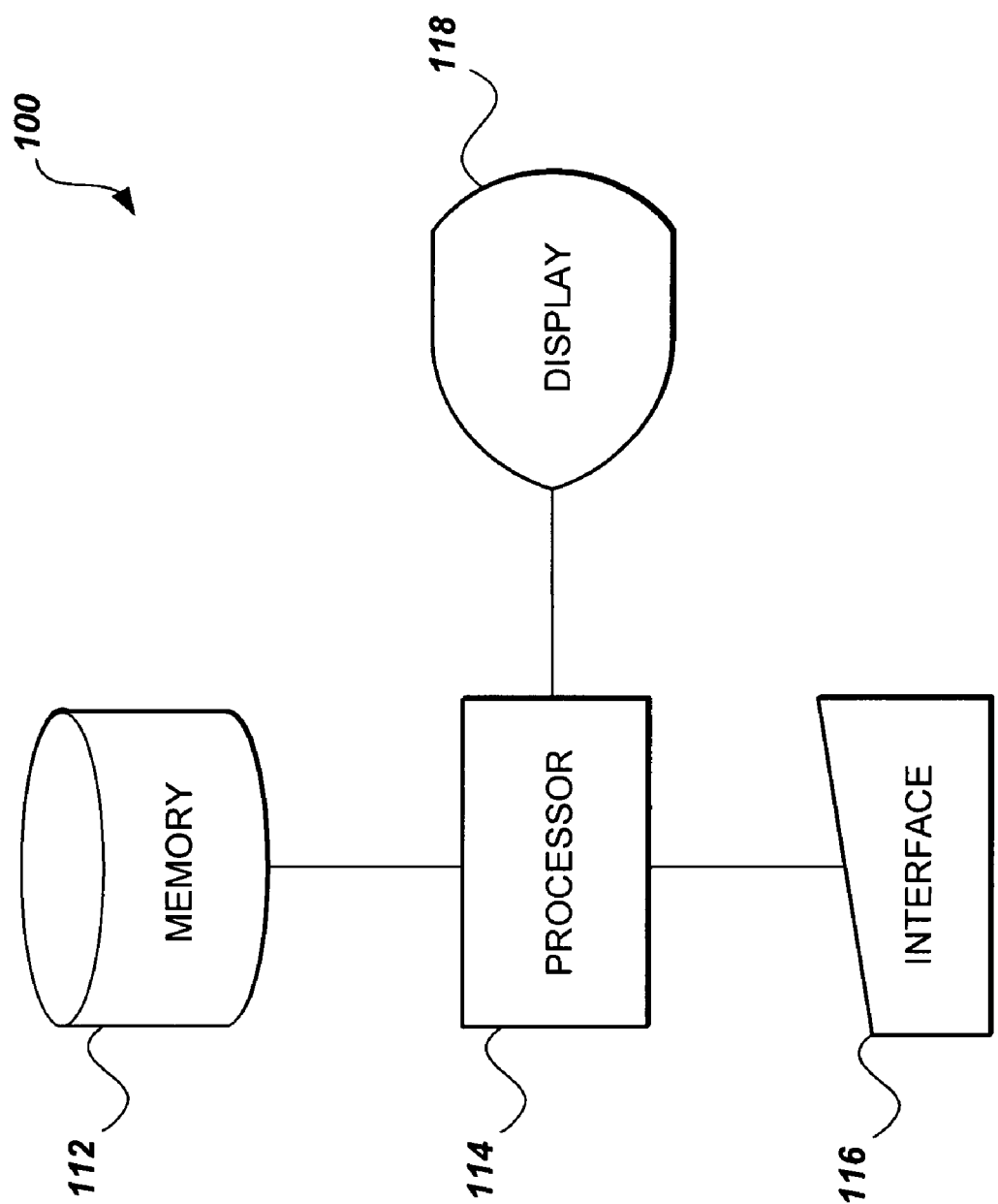

METHOD OF PERFORMING ELLIPTIC POLYNOMIAL CRYPTOGRAPHY WITH ELLIPTIC POLYNOMIAL HOPPING

BACKGROUND OF THE INVENTION

1. Field of the Invention

The present invention relates to computerized cryptographic methods for communications in a computer network or electronic communications system, and particularly to a method of performing elliptic polynomial cryptography with elliptic polynomial hopping.

2. Description of the Related Art

Encryption systems have been categorized in the art into two types, based on the characteristics of the cryptographic key: asymmetric encryption systems and symmetric encryption systems. Asymmetric encryption systems are also called dual-key systems or public-key systems. In the public-key encryption systems, there is a public key and a private key. The public key is made public, while the private key remains secret. Encryption is performed with the public key, while decryption is done with the private key. The public key and the private key are totally different, and it is difficult to derive one by inference from the other. Thus, the ability to encrypt can be separated from the ability to decrypt.

Symmetric encryption systems are also called single-key systems, private-key systems, or traditional encryption systems. Private-key systems can be categorized into stream encryption systems and block encryption systems. In a stream encryption system, plain data is encrypted on an element-by-element basis (in computer systems, one letter, character, or bit at a time). In contrast, in a block encryption system, plain data is divided into blocks with each block containing plural elements, and encryption is carried out on a block-by-block basis (in computer systems, blocks of letters, characters, or bits at a time).

Block ciphers are the most popular algorithms in use today for providing data privacy. Block ciphers with block size n and key size k can be viewed as a family of permutations on the set of all n-bit strings, indexed by k-bit long encryption keys and possessing certain properties. Block ciphers use fix-sized blocks. A 128-bit plain text block will generate a 128-bit ciphertext block when encrypted. If the message is shorter than the block size, the message is padded to bring the block size up to whatever is required by the particular block cipher being used. If the message is longer than the block size, then the message will be encoded using a mode or method designed to make the encrypted message less vulnerable to attack.

From the mid-1970s through the 1990s, the Data Encryption Standard (DES) was probably the most popular and widely used block cipher cryptographic algorithm. DES had a block size of 64 bits and a key size of 56 bits, and implemented a Feistel structure built on a series of exclusive-or (XOR) operations. When the message size exceeded the block size, DES employed one of several modes. The simplest, electronic codebook (ECB), is too vulnerable to attack if the message is too long and has repeating phrases because two blocks of equivalent plaintext characters always encrypts to the same block of ciphertext. Other modes include cipher block chaining (CBC), cipher feedback (CFB), and output feedback (OFB), of which CBC is the most popular. In CBC, each plaintext block is XORed with the previous plaintext block, beginning with an initialization vector for the first block.

Once thought secure, DES has proved vulnerable to attach through increases in the speed and memory storage of computer hardware. It is now possible for an attacker to decrypt a DES encrypted message by an exhaustive key search in a comparatively short amount of time. Although DES, or variations of DES, such as 3DES or Triple DES, is still used, it is being replaced by the Advance Encryption Standard (AES).

AES uses a 128-bit block size and may use a key size of 128 bits, 192 bits, or 256 bits. The algorithm has a Rijndael structure, which again relies upon a series of XOR operations. Nevertheless, there are concerns about the adequacy of the AES algorithm due to its simple algebraic structure. Moreover, the increase in block size may be inconvenient to implement, is not truly scalable (only three key sizes are implemented or permitted), the hardware for a 192-bit key is not completely compatible with the hardware for a 128-bit or 256-bit key, and advances in computer hardware speed and memory may eventually make AES vulnerable to an exhaustive key search in the same manner as DES.

The fundamental problem with DES, AES, and other similar block cipher algorithms is that these algorithms are essentially based upon simple XOR operations, and not upon a computationally hard or infeasible problem, such as the discrete logarithm problem or the elliptic curve (EC) analog to the discrete logarithm problem.

Elliptic curve cryptosystems are well known in the art. Elliptic curve cryptosystems rely upon the difficulty of the Elliptic Curve Discrete Logarithm Problem (ECDLP) to provide their effectiveness as a cryptosystem. Using multiplicative notation, the problem can be described as: given points B and Q in the group (points in a finite field satisfying a given elliptic curve equation), find a number k such that $B^k=Q$; where k is called the discrete logarithm of Q to the base B. Using additive notation, the problem becomes: given two points B and Q in the group, find a number k such that $kB=Q$.

Conventional elliptic curve arithmetic and properties, including point addition, scalar multiplication, point doubling, projective coordinates, etc., are well known in the art, and have been described in numerous texts, treatises, and cryptography handbooks, e.g., *Guide to Elliptic Curve Cryptography*, Hankerson et al., Springer 2004. A summary of such operations and properties appears in paragraphs [0012] through [0026] of U.S. Pat. No. 7,483,533, issued Jan. 27, 2009, which are hereby incorporated by reference.

Elliptic curve cryptography is gaining increasing acceptance in public-key applications, such as public key exchange, digital signatures, etc. because elliptic curve cryptography permits smaller key size than RSA and other such algorithms, and the difficulty of attacking or solving the EC discrete logarithm problem. However, elliptic curve cryptography is not widely used for symmetric encryption systems, block ciphers, or encryption of long messages.

The difficulty with such applications arises from the process for encrypting a plaintext message using an elliptic curve. In conventional elliptic curve cryptography, conventional bit string embedding into an elliptic curve point involves and iterative algorithm to search for an x-coordinate value that will lead to a quadratic residue value of the y-coordinate starting from an initial x-coordinate value specified by the bit string to be embedded. The process normally requires several iterations, and the number of iterations needed is different for different bit strings that are being embedded. This process incurs considerable overhead in time and in memory storage, since look-up tables are often used. Also, in convention elliptic curve cryptography, an elliptic curve polynomial defined over a finite field that needs N-bits for representation of its elements, only $((n_x+n_y+1)N-L)$ bits of the message data bits can be embedded in any elliptic polynomial point, where L is the number of extra bits that do not carry data.

U.S. Pat. No. 7,483,533, issued Jan. 27, 2009 to Ibrahim (one of the present inventors), which is hereby incorporated by reference in its entirety, described a cryptographic system based upon Ibrahim's elliptic polynomial equation, which has more than one x-coordinate into which data may be embedded. The '533 patent described methods for using an elliptic polynomial with more than one x-coordinate for digital signatures, public-key cryptography, and at least one method for use in symmetric or shared key cryptography. However, there still exists a need for an efficient, secure method for encrypting messages for symmetric encryption systems, and one that is particularly suitable for block ciphers.

Thus, a method of performing elliptic polynomial cryptography with elliptic polynomial hopping solving the aforementioned problems is desired.

SUMMARY OF THE INVENTION

The method of performing elliptic polynomial cryptography with elliptic polynomial hopping contemplates improving the security of exiting block ciphers by using elliptic polynomial cryptography. Different elliptic polynomials are used to encrypt different blocks of the same plaintext. The method provides for communicating securely over an insecure channel using symmetric key elliptic polynomial cryptography, which uses an elliptic polynomial with more than one independent x-coordinate, as described in U.S. Pat. No. 7,483,533, issued Jan. 27, 2009 to Ibrahim, the contents of which are incorporated by reference in their entirety.

More specifically, given a set of elliptic polynomial points that satisfy an elliptic polynomial equation with more than one independent x-coordinate defined over a finite field F of the following form:

one of the variables, termed the y-coordinate, has a maximum degree of two, and appears on its own in only one of the monomials;

the other variables, termed the x-coordinates, have a maximum degree of three, and each must appear in at least one of the monomials with a degree of three; and all monomials that contain x-coordinates must have a total degree of three;

and given that the group of points of the elliptic polynomial with the above form are defined over additions in the extended dimensional space described in the '533 patent, the new method contemplates the use of elliptic polynomial hopping, wherein different elliptic polynomials are used to encrypt different blocks of the same plaintext, and wherein the number of x-coordinates and the underlying finite filed used could also be varied and selected from a pre-defined set.

By using elliptic polynomial cryptography with more than one x-coordinate, the additional x-coordinates may be used to embed extra message data bits in a single elliptic point that satisfies an elliptic polynomial equation. Given that nx additional x-coordinates are used, with nx greater or equal to one, a resulting elliptic point has (nx+1) x-coordinates, wherein all coordinates are elements of a finite field F. The number of points that satisfy an elliptic polynomial equation with nx additional x-coordinates defined over F and that can be used in the corresponding cryptosystem is increased by a factor of $(\#F)^{nx}$, where # denotes the size of a field.

This provides increasing security, wherein different elliptic polynomial are used to encrypt successive message blocks, and wherein each elliptic polynomial used to encrypt each message block is selected at random using an initial secret key and a random number generator. The only information known to an attacker would be the size of the ciphertext blocks.

The elliptic polynomial hopping method disclosed herein is made possible, wherein it is shown that the given form of the elliptic polynomial equation described above ensures that an elliptic polynomial and its twist are isomorphic to each other.

The embedding method allows the embedding of a bit string into the x-coordinates of an elliptic polynomial point in a deterministic and non-iterative manner when the elliptic polynomial has the above-described form. This new deterministic and non-iterative embedding method requires less time overhead than conventional iterative embedding methods used in existing elliptic curve polynomial cryptography, and also does not require a different number of iterations for different bit strings that are being embedded. This makes the method suitable for block ciphers.

The isomorphic relationship between an elliptic polynomial and its twist, which is obtained as a result of the given form of the elliptic polynomial equation, ensures that any bit string whose equivalent binary value is an element of the underlying finite field has a bijective relationship between the bit string and a point, which is either on an elliptic polynomial or its twist. This bijective relationship allows the development of elliptic polynomial hopping-based encryption.

Furthermore, up to (nx+ny+1)N bits (i.e. more than ((nx+ny+1)N−L) bits) can be encrypted in each elliptic polynomial point. In the classical approach of elliptic curve polynomial cryptography encryption and decryption, the security of the resulting cryptosystem relies on breaking the elliptic polynomial discrete logarithm problem, which can be summarized as: given the points $k(x_{0,B}, x_{1,B}, \ldots, x_{nx,B}, y_B)$ and $(x_{0,B}, x_{1,B}, x \ldots, x_{nx,B}, y_B)$, find the scalar k.

In the present method, different elliptic polynomials are used to encrypt successive message blocks, and the elliptic polynomials used to encrypt each succeeding message block are selected at random using an initial secret key and a random number generator. Since the elliptic polynomials used to encrypt each successive message block is not known, this makes the elliptic polynomial discrete logarithm problem much more difficult to solve, since the attacker does not know the elliptic polynomial coefficients that are needed to compute point additions and point doublings. The harder problem of the solving the discrete logarithm problem when the used elliptic polynomial is not known can be used either to increase security for the same finite field, or to reduce complexity for the same security by using a finite field with a smaller order.

In addition, all of the elliptic polynomial cryptography-based cipher block chaining methods disclosed herein are scalable, i.e., the key size may be changed without changing the underlying algorithm.

These and other features of the present invention will become readily apparent upon further review of the following specification and drawings.

BRIEF DESCRIPTION OF THE DRAWINGS

The sole drawing FIGURE is a block diagram illustrating system components for implementing the method of performing elliptic polynomial cryptography with elliptic polynomial hopping according to the present invention.

These and other features of the present invention will become readily apparent upon further review of the following specification and drawings.

DETAILED DESCRIPTION OF THE PREFERRED EMBODIMENTS

The method of performing elliptic polynomial cryptography with elliptic polynomial hopping provides elliptic polynomial cryptographic methods based on the elliptic polynomial discrete logarithm problem. It is well known that an elliptic polynomial discrete logarithm problem is a computationally "difficult" or "hard" problem.

The elliptic polynomial encryption methods to be described below use elliptic polynomials in their generation, where different elliptic polynomials are used for different blocks of the same plaintext. Particularly, the cryptographic methods use an elliptic polynomial with more than one independent x-coordinate. More specifically, a set of elliptic polynomial points are used which satisfy an elliptic polynomial equation with more than one independent x-coordinate which is defined over a finite field F having the following properties: One of the variables (the y-coordinate) has a maximum degree of two, and appears on its own in only one of the monomials; the other variables (the x-coordinates) have a maximum degree of three, and each must appear in at least one of the monomials with a degree of three; and all monomials which contain x-coordinates must have a total degree of three.

The group of points of the elliptic polynomial with the above form is defined over additions in the extended dimensional space, and, as will be described in detail below, the method makes use of elliptic polynomials where different elliptic polynomials are used for different blocks of the same plaintext.

The particular advantage of using elliptic polynomial cryptography with more than one x-coordinate is that additional x-coordinates are used to embed extra message data bits in a single elliptic point that satisfies the elliptic polynomials equation. Given that nx additional x-coordinates are used, with nx being greater than or equal to one, a resulting elliptic point has (nx+1) x-coordinates, where all coordinates are elements of the finite field F. The number of points which satisfy an elliptic polynomials equation with nx additional x-coordinates defined over F and which can be used in the corresponding cryptosystem is increased by a factor of $(\#f)^{nx}$, where # denotes the size of a field.

Through the use of this particular method, security is increased through the usage of different elliptic polynomials for different message blocks during the encryption. Further, the elliptic polynomial used for each message block is selected at random, preferably using an initial value and a random number generator.

Given the form of the elliptic polynomial equation described above, the elliptic polynomial and its twist are isomorphic with respect to one another. The method uses an embedding technique, to be described in greater detail below, which allows the embedding of a bit string into the x-coordinates of an elliptic polynomial point in a deterministic and non-iterative manner when the elliptic polynomial has the above described form. This embedding method overcomes the disadvantage of the time overhead of the iterative embedding methods used in existing elliptic polynomial-based methods.

The difficulty of using conventional elliptic polynomial cryptography for message encryption typically lies in the iterative and non-deterministic method needed to embed a bit string into an elliptic polynomial point, which has the drawback of the number of iterations needed being different for different bit strings which are being embedded. As a consequence, different calculation times are required for different blocks of bit strings. Such a data-dependant generation time is not suitable for generalized encryption methods, which require data independent encryption times. Further, with regard to iterative and non-deterministic methods in conventional elliptic polynomial cryptography, given an elliptic polynomial defined over a finite field that needs N-bits for the representation of its elements, only $((nx+ny+1)N-L)$ bits of the message data bits can be embedded in any elliptic polynomial point.

The isomorphic relationship between an elliptic polynomial and its twist, which is obtained as a result of the given form of the elliptic polynomial equation, ensures that any bit string whose equivalent binary value is an element of the underlying finite field has a bijective relationship between the bit string and a point which is either on the elliptic polynomial or its twist. This bijective relationship allows for the development of the encryption to be described below.

In the conventional approach to elliptic polynomial cryptography, the security of the resulting cryptosystem relies on breaking the elliptic polynomial discrete logarithm problem, which can be summarized as: given the points $k(x_{0,B}, x_{1,B}, \ldots, x_{nx,B}, y_B)$ and $(x_{0,B}, x_{1,B}, \ldots, x_{nx,B}, y_B)$, find the scalar k.

Further, projective coordinates are used at the sending and receiving entities in order to eliminate inversion or division during each point addition and doubling operation of the scalar multiplication. It should be noted that all of present methods disclosed herein are scalable.

In the following, with regard to elliptic polynomials, the "degree" of a variable $u^i$ is simply the exponent i. A polynomial is defined as the sum of several terms, which are herein referred to as "monomials", and the total degree of a monomial $u^i v^j w^k$ is given by $(i+j+k)$. Further, in the following, the symbol E denotes set membership.

One form of the subject elliptic polynomial equation with more than one x-coordinate and one or more y-coordinates is defined as follows: the elliptic polynomial is a polynomial with more than two independent variables such that the maximum total degree of any monomial in the curve is three; at least two or more of the variables, termed the x-coordinates, have a maximum degree of three, and each must appear in at least one of the monomials with a degree of three; and at least one or more variables, termed the y-coordinates, have a maximum degree of two, and each must appear in at least one of the monomials with a degree of two.

Letting $S_{nx}$ represents the set of numbers from 0 to nx (i.e., $S_{nx}=\{0, \ldots, nx\}$), and letting $S_{ny}$ represents the set of numbers from 0 to ny (i.e., $S_{ny}=\{0, \ldots, ny\}$), and further setting $(nx+ny) \geq 1$, then, given a finite field, F, the following equation defined over F is one example of the polynomial described above:

$$\sum_{k \in S_{ny}} a_{1k} y_k^2 + \sum_{k,l \in S_{ny}, l \neq k} a_{2kl} y_k y_l + \sum_{k \in S_{ny}} a_{3k} y_k + \sum_{k,l \in S_{ny}, i \in S_{nx}} c_{1kli} y_k y_l x_i + \quad (1)$$

$$\sum_{k \in S_{ny}, l \in S_{nx}} c_{2kl} y_k x_l + \sum_{k \in S_{ny}, l,i \in S_{nx}} c_{3kli} y_k x_l x_i =$$

$$\sum_{l \in S_{nx}} b_{1l} x_l^3 + \sum_{l,k \in S_{nx}, l \neq k} b_{2lk} x_l^2 x_k + \sum_{l,k \in S_{nx}} b_{3lk} x_l x_k + \sum_{k \in S_{nx}} b_{4k} x_k + b_c$$

where $a_{1l}, a_{2kl}, a_{3k}, c_{1lki}, c_{2kl}, c_{3kli}, b_{1l}, b_{2lk}, b_{3lk}, b_{4k}$ & $b_c \in F$.

Two possible examples of equation (1) are $y_0^2 = x_0^3 + x_1^3 + x_0 x_1$ and $y_0^2 + x_0 x_1 y_0 + y_0 = x_0^3 + x_1^3 + x_0^2 x_1 + x_0 x_1^2 + x_0 + x_1 + x_0 + x_1$.

With regard to the use of the elliptic polynomial equation in the addition of points of an elliptic polynomial with more than one x-coordinate and one or more y-coordinates, we may examine specific coefficients $a_{1k}, a_{2kl}, a_{3k}, c_{1lki}, c_{2kl}, c_{3kli}, b_{1l}, b_{2lk}, b_{3lk}, b_{4k}$ & $b_c \in F$ for F, wherein a set of points $EC^{nx+ny+2}$ is defined as the (nx+ny+2)-tuple $(x_0, x_1, \ldots, x_{nx}, y_0, y_1, \ldots, y_{ny})$, wherein $x_i, y_k \in F$, $i \in S_{nx}$ and $k \in S_{ny}$. This set of points are solutions of F, though excluding the point $(0, 0, \ldots, 0)$ and the point at infinity, $(x_{0,1}, x_{1,1}, \ldots, x_{nx,1}, y_{0,1} y_{1,0}, \ldots, y_{ny,1})$.

The rules for conventional elliptic curve point addition may be adopted to define an additive binary operation, "+", over $EC^{nx+ny+2}$, i.e., for all $$(x_{0,1}, x_{1,1}, \ldots, x_{nx,1}, y_{0,1}, y_{1,1}, \ldots, y_{ny,1}) \in EC^{nx+ny+2}$$
and
$$(x_{0,2}, x_{1,2}, \ldots, x_{nx,2}, y_{0,2}, y_{1,2}, \ldots, y_{ny,2}) \in EC^{nx+ny+2},$$

the sum:

$$(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2})$$

is also $$(x_{0,3}, x_{1,3}, \ldots, x_{nx,3}, y_{0,3}, y_{1,3}, \ldots, y_{ny,3}) \in EC^{nx+ny+2}.$$

As will be described in greater detail below, $(EC^{nx+ny+2}, +)$ forms a pseudo-group (p-group) over addition that satisfies the following axioms:

(i) There exists a set $(x_{0,1}, x_{1,1}, \ldots, x_{nx,1}, y_{0,1}, y_{1,1}, \ldots, y_{ny,1}) \in EC^{nx+ny+2}$ such that $(x_0, x_1, \ldots, x_{nx}, y_0, y_1, \ldots, y_{ny}) + (x_{0,1}, x_{1,1}, \ldots, x_{nx,1}, y_{0,1}, y_{1,1}, \ldots, y_{ny,1}) = (x_0, x_1, \ldots, x_{nx}, y_0, y_1, \ldots, y_{ny})$ for all $(x_0, x_1, \ldots, x_{nx}, y_0, y_1, \ldots, y_{ny}) \in EC^{nx+ny+2}$;

(ii) for every set $(x_0, x_1, \ldots, x_{nx}, y_0, y_1, \ldots, y_{ny}) \in EC^{nx+ny+2}$, there exists an inverse set, $-(x_0, x_1, \ldots, x_{nx}, y_0, y_1, \ldots, y_{ny}) \in EC^{nx+ny+2}$, such that $(x_0, x_1, \ldots, x_{nx}, y_0, y_1, \ldots, y_{ny}) - (x_0, x_1, \ldots, x_{nx}, y_0, y_1, \ldots, y_{ny}) = (x_{0,1}, x_{1,1}, \ldots, x_{nx,1}, y_{0,1}, y_{1,1}, \ldots, y_{ny,1})$;

(iii) the additive binary operation in $(EC^{nx+ny+2}, +)$ is commutative, and the p-group $(EC^{nx+ny+2}, +)$ forms a group over addition when:

(iv) the additive binary operation in $(EC^{nx+ny+2}, +)$ is associative.

Prior to a more detailed analysis of the above axioms, the concept of point equivalence must be further developed. Mappings can be used to indicate that an elliptic point represented using (nx+1) x-coordinates and (ny+1) y-coordinates, $(x_0, x_1, \ldots, x_{nx}, y_0, y_1, \ldots, y_{ny})$ is equivalent to one or more elliptic points that satisfy the same elliptic polynomial equation, including the equivalence of an elliptic point to itself.

Points that are equivalent to one another can be substituted for each other at random, or according to certain rules during point addition and/or point doubling operations. For example, the addition of two points $(x_{0,1}, x_{1,1}, \ldots, x_{nx,1}, y_{0,1}, y_{1,1}, \ldots, y_{ny,1})$ and $(x_{0,2}, x_{1,2}, \ldots, y_{0,2}, y_{1,2}, \ldots, y_{ny,2})$ is given by:

$$(x_{0,3}, x_{1,3}, \ldots, x_{nx,3}, y_{0,3}, y_{1,3}, \ldots, y_{ny,3}) = (x_{0,1}, x_{1,1}, \ldots, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2})$$

If the point $(x''_{0,1}, x''_{1,1}, \ldots, x''_{nx,1}, y''_{0,1}, y''_{1,1}, \ldots, y''_{ny,1})$ is equivalent to the point $(x_{0,1}, x_{1,1}, \ldots, x_{nx,1}, y_{0,1}, y_{1,1}, \ldots, y_{ny,1})$, then the former can be substituted for $(x_{0,1}, x_{1,1}, \ldots, x_{nx,1}, y_{0,1}, y_{1,1}, \ldots, y_{ny,1})$ in the above equation in order to obtain:

$$(x_{0,3}, x_{1,3}, \ldots, x_{nx,3}, y_{0,3}, y_{1,3}, \ldots, y_{ny,3}) = (x''_{0,1}, x''_{1,1}, \ldots, x''_{nx,1}, y''_{0,1}, y''_{1,1}, \ldots, y''_{ny,1}) + (x_{0,2}, x_{1,2}, \ldots, x_{nx,2}, y_{0,2}, y_{1,2}, \ldots, y_{ny,2}).$$

Mappings that are used to define equivalences can be based on certain properties that exist in elliptic polynomial equations, such as symmetry between variables. As an example, we consider the point $(x_0, x_1, y_0)$ that satisfies the equation $y_0^2 = x_0^3 + x_1^3 + x_0 x_1$. The equivalent of this point may be defined as $(x_1, x_0, -y_0)$.

With regard to the addition rules for $(EC^{nx+ny+2}, +)$, the addition operation of two points $(x_0, x_{1,1}, \ldots, x_{nx,1}, y_{0,1}, jy_{1,1}, \ldots, y_{ny,1}) \in EC^{nx+ny+2}$ and $(x_{0,2}, x_{1,2}, \ldots, x_{nx,2}, y_{0,2}, y_{1,2}, \ldots, y_{ny,2}) \in EC^{nx+ny+2}$, otherwise expressed as:

$$(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2})$$

is calculated in the following manner. First, a straight line is drawn which passes through the two points to be added. The straight line intersects $EC^{nx+ny+2}$ at a third point, which we denote $(x'_{0,3}, x'_{1,3}, \ldots, x'_{nx,3}, y'_{0,3}, y'_{1,3}, \ldots, y_{ny,3}^+) \in EC^{nx+ny+2}$. The sum point is defined as $(x_{0,3}, x_{1,3}, \ldots, x_{nx,3}, y_{0,3}, y_{1,3}, \ldots, y_{ny,3}) = -(x'_{0,3}, x'_{1,3}, \ldots, x'_{nx,3}, y'_{0,3}, y'_{1,3}, \ldots, y'_{ny,3})$.

From the above definition of the addition rule, addition over $EC^{nx+ny+2}$ is commutative, that is:

$$(x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2}) = (x_{0,2}, x_{1,2}, \ldots, x_{nx,2}, y_{0,2}, y_{1,2}, \ldots, y_{ny,2}) + (x_{0,1}, x_{1,1}, \ldots, x_{nx,1}, y_{0,1}, y_{1,1}, \ldots, y_{ny,1})$$

for all $(x_{0,1}, x_{1,1}, \ldots, x_{nx,1}, y_{0,1}, y_{1,1}, \ldots, y_{ny,1}) \in EC^{nx+ny+2}$ and for all $(x_{0,2}, x_{1,2}, \ldots, x_{nx,2}, y_{0,2}, y_{1,2}, \ldots, y_{ny,2}) \in EC^{nx+ny+2}$. This commutivity satisfies axiom (iii) above.

There are two primary cases that need to be considered for the computation of point addition for $(EC^{nx+ny+2}, +)$: (A) for at least one $j \in S_{nx}$, $x_{j,1} \neq x_{j,2}$; and (B) for all $j \in S_{nx}$, $x_{j,1} = x_{j,2} = jx_{j,o}$. Case B includes three sub-cases:

i. for all $k \in S_{ny} y_{k,1} = y_{k,2}$ that is:

$$(x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2}),$$

which corresponds to point doubling;

ii. for $k \in S_{ny}$ & $k \neq 0$, $y_{k,1} = y_{k,2}$ and where $y_{0,1}$ & $y_{0,2}$ are the roots of the following quadratic equation in $y_0$:

$$a_{10} y_0^2 + \sum_{k \in S_{ny}, k \neq 0} a_{1k} y_{k,l}^2 + y_0 \left\{ \sum_{k \in S_{ny}, k \neq 0} a_{2k0} y_{k,1} + \sum_{l \in S_{ny}, l \neq 0} a_{201} y_{l,1} \right\} +$$

$$\sum_{k,l \in S_{ny}, l \neq k, \& k \neq 0} a_{2kl} y_{k,1} y_{l,1} + a_{30} y_0 + \sum_{k \in S_{ny}, k \neq 0} a_{3k} y_{k,1} +$$

$$y_0^2 \sum_{i \in S_{nx}} c_{100i} x_{i,1} + y_0 \left\{ \sum_{k \in S_{ny}, i \in S_{nx}} c_{1k0i} y_{k,1} x_{i,1} + \sum_{l \in S_{ny}, i \in S_{nx}} c_{10li} y_{l,1} x_{i,1} \right\} +$$

$$\sum_{k,l \in S_{ny}, l \& k \neq 0, i \in S_{nx}} c_{1kli} y_{k,1} y_{l,1} x_{i,1} +$$

$$y_0 \sum_{l \in S_{nx}} c_{20l} x_{l,1} + \sum_{k \in S_{ny}, k \neq 0, l \in S_{nx}} c_{2kl} y_{k,1} x_{l,1} +$$

$$y_0 \sum_{l,i \in S_{nx}} c_{30li} x_{l,1} x_{i,1} + \sum_{k \in S_{ny}, k \neq 0, i \in S_{nx}} c_{3kli} y_{k,1} x_{l,1} x_{i,1} =$$

$$\sum_{l \in S_{nx}} b_{1l} x_{l,1}^3 + \sum_{l,k \in S_{nx}, l \neq k} b_{2lk} x_{l,1}^2 x_{k,1} + \sum_{l,k \in S_{nx}} b_{3lk} x_{l,1} x_{k,1} + \sum_{k \in S_{nx}} b_{4k} x_{k,1} + b_c,$$

which corresponds to point inverse; and iii. all other conditions except those in Cases B.i and B.ii. This case occurs only when ny is greater than or equal to one.

For Case A, for at least one $j \in S_{nx} x_{j,1} \neq x_{j,2}$, a straight line in (nx+ny+2)-dimensional space is defined by $$\frac{y_k - y_{k,1}}{y_{k,2} - y_{k,1}} = \frac{x_j - x_{j,1}}{x_{j,2} - x_{j,1}},$$

$k \in S_{ny}$ and $j \in S_{nx}$ and $$\frac{x_i - x_{i,1}}{x_{i,2} - x_{i,1}} = \frac{x_j - x_{j,1}}{x_{j,2} - x_{j,1}},$$

$i \neq j, i \in S_{nx}$.

For this case, $y_k = m_{yk} x_j + c_{yk}$, where $$m_{yk} = \frac{y_{k,2} - y_{k,1}}{x_{j,2} - x_{j,1}}$$

and $c_{yk} = y_{k,1} - x_{j,1} m_{jk}$. Further, $x_i = m_{xi} x_j + c_{xi}$, where $$m_{xi} = \frac{x_{i,2} - x_{i,1}}{x_{j,2} - x_{j,1}}$$

and $c_{xi} = x_{i,1} - x_{j,1} m_{xi}$. Equation (1) can then be re-written as:

$$\sum_{k \in S_{ny}} a_{1k} y_k^2 + \sum_{k,l \in S_{ny}, l \neq k} a_{2kl} y_k y_l + \sum_{k \in S_{ny}} a_{3k} y_k +$$
$$x_j \sum_{k,l \in S_{ny}} c_{1klj} y_k y_l + \sum_{k,l \in S_{ny}, i \in S_{nx}, i \neq j} c_{1kli} y_k y_l x_i + x_j \sum_{k \in S_{ny}} c_{2kj} y_k +$$
$$\sum_{k \in S_{ny}, l \in S_{nx}, l \neq j} c_{2kl} y_k x_l + x_j^2 \sum_{k \in S_{ny}} c_{3kjj} y_k + \sum_{k \in S_{ny}, l \in S_{nx}, l \neq j} c_{3klj} y_k x_l +$$
$$x_j \sum_{k \in S_{ny}, i \in S_{nx}, i \neq j} c_{3kji} y_k x_i + \sum_{k \in S_{ny}, l, i \in S_{nx}, l \& i \neq j} c_{3kli} y_k x_l x_i =$$
$$b_{1j} x_j^3 + \sum_{l \in S_{nx}, l \neq j} b_{1l} x_l^3 + x_j^2 \sum_{k \in S_{nx}, k \neq j} b_{2jk} x_k + x_j \sum_{l \in S_{nx}, l \neq j} b_{2lj} x_l^2 +$$
$$\sum_{l,k \in S_{nx}, l, k \neq j, l \neq k} b_{2lk} x_l^2 x_k + b_{3jj} x_j^2 + x_j \sum_{k \in S_{nx}, k \neq j} b_{3jk} x_k +$$
$$x_j \sum_{l \in S_{nx}, l \neq j} b_{3lj} x_l + \sum_{l,k \in S_{nx}, l,k \neq j} b_{3lk} x_l x_k + b_{4j} x_j + \sum_{k \in S_{nx}, k \neq j} b_{4k} x_k + b_c,$$

and substitution of the above into the rewritten equation (1) for $y_k$, $k \in S_{ny}$ and $x_i$, $i \in S_{nx}$ & $i \neq j$, results in:

$$\sum_{k \in S_{ny}} a_{1k}(m_{yk} x_j + c_{yk})^2 + \sum_{k,l \in S_{ny}, l \neq k} a_{2kl}(m_{yk} x_j + c_{yk})(m_{yl} x_j + c_{yl}) +$$
$$\sum_{k \in S_{ny}} a_{3k}(m_{yk} x_j + c_{yk}) + x_j \sum_{k,l \in S_{ny}} c_{1klj}(m_{yk} x_j + c_{yk})(m_{yl} x_j + c_{yl}) +$$
$$\sum_{k,l \in S_{ny}, i \in S_{nx}, i \neq j} c_{1kli}(m_{yk} x_j + c_{yk})(m_{yl} x_j + c_{yl})(m_{xi} x_j + c_{xi}) +$$
$$x_j \sum_{k \in S_{ny}} c_{2kj}(m_{yk} x_j + c_{yk}) + \sum_{k \in S_{ny}, l \in S_{nx}, l \neq j} c_{2kl}(m_{yk} x_j + c_{yk})(m_{xl} x_j + c_{xl}) +$$
$$x_j^2 \sum_{k \in S_{ny}} c_{3kjj}(m_{yk} x_j + c_{yk}) +$$

-continued $$x_j \sum_{k \in S_{ny}, l \in S_{nx}, l \neq j} c_{3klj}(m_{yk} x_j + c_{yk})(m_{xl} x_j + c_{xl}) +$$
$$x_j \sum_{k \in S_{ny}, i \in S_{nx}, i \neq j} c_{3kji}(m_{yk} x_j + c_{yk})(m_{xi} x_j + c_{xi}) +$$
$$\sum_{k \in S_{ny}, l, i \in S_{nx}, l \& i \neq j} c_{3kli}(m_{yk} x_j + c_{yk})(m_{xl} x_j + c_{xl})(m_{xi} x_j + c_{xi}) =$$
$$b_{1j} x_j^3 + \sum_{l \in S_{nx}, l \neq j} b_{1l}(m_{xl} x_j + c_l)^3 + x_j^2 \sum_{k \in S_{nx}, k \neq j} b_{2jk}(m_{xk} x_j + c_{xk}) +$$
$$x_j \sum_{l \in S_{nx}, l \neq j} b_{2lj}(m_{xl} x_j + c_{xl})^2 +$$
$$\sum_{l,k \in S_{nx}, l \& k \neq j, l \neq k} b_{2lk}(m_{xl} x_j + c_{xl})^2 (m_{xk} x_j + c_{xk}) + b_{3jj} x_j^2 +$$
$$x_j \sum_{k \in S_{nx}, k \neq j} b_{3jk}(m_{xk} x_j + c_{xk}) + x_j \sum_{l,k \in S_{nx}, l \neq j} b_{3lj}(m_{xl} x_j + c_{xl}) +$$
$$\sum_{l,k \in S_{nx}, l \& k \neq j} b_{3lk}(m_{xl} x_j + c_{xl})(m_{xk} x_j + c_{xk}) +$$
$$b_{4j} x_j + \sum_{k \in S_{nx}, k \neq j} a_{6k}(m_{xk} x_j + c_{xk}) + b_c$$

Expanding the terms in the above equation leads to a cubic equation in $x_j$, $C_3 x_j^3 + C_2 x_j^2 + C_1 x_j + C_0 = 0$ where $C_3, C_2, C_1$ & $C_0$ are obtained from the above equation.

Assuming $C_3 \neq 0$, the above cubic equation in $x_j$ has three roots $x_{j,1}, x_{j,2}$, & $x'_{j,3}$ and can be written as $(x_j - x_{j,1})(x_j - x_{j,2})(x_j - x'_{j,3}) = 0$. Normalizing by the coefficient of $x^3$ and equating the coefficients of $x^2$ in the resulting equation with that in $(x_j - x_{j,1})(x_j - x_{j,2})(x_j - x_{j,3}) = 0$, one obtains a solution for $x'_{j,3}$;

$$x'_{j,3} = \frac{-C_2}{C_3} - x_{j,1} - x_{j,2}. \tag{2}$$

The values of $y'_{k,3}$, $k \in S_{ny}$, and $x'_{i,3}$, $i \in S_{nx}$ & $i \neq j$, may be similarly obtained from equations for $x_j = x'_{j,3}$.

For cases where $C_3 = 0$, $C_3 x_j^3 + C_2 x_j^2 + C_1 x_j + C_0 = 0$ becomes a quadratic equation. Such quadratic equations may be used in the definition of point equivalences.

With regard to Case B for all $j \in S_{nx}$, $x_{j,1} = x_{j,2}$, the three sub-cases are considered below. In all cases, $x_{j,0}$ is defined as $x_{j,o} = x_{j,1} = x_{j,2}$, $j \in S_{nx}$.

For Case B.i., all $k \in S_{ny}$, $y_{k,1} = y_{k,2}$, which corresponds to point doubling. In this case, $(x_{0,1}, x_{1,1}, \ldots, x_{nx,1}, y_{0,1}, jy_{1,1}, \ldots, y_{ny,1}) = (x_{0,2}, x_{1,2}, \ldots, x_{nx,2}, y_{0,2}, \ldots, y_{ny,2})$. Letting:

$$(x_{0,o}, x_{1,o}, \ldots, x_{nx,o}, y_{0,o}, y_{1,o}, \ldots, y_{ny,o}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2})$$

the sum is written as $$(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,o}, y_{1,o}, \ldots, y_{ny,o}) + (x_{0,o}, x_{1,o}, \ldots, x_{nx,o}, y_{0,o}, y_{1,o}, \ldots, y_{ny,o}) \tag{3}$$

There are several ways of defining the addition in this case. Three possible rules are described below. Case B.i.1: Letting $S_{nx,Lx}$ denote a subset of $S_{nx}$ with Lx elements, i.e., $S_{nx,LX} \subseteq S_{nx}$; letting $S_{ny,Ly}$ denote a subset of $S_{ny}$ with Ly elements and which does not include the element 0; i.e. $S_{ny,Ly} \subseteq S_{ny}$ and $0 \notin S_{ny,Ly}$; setting the value of Lx and Ly as at least one, then the straight line in this case can be defined as a tangent to the point $(x_{0,o}, x_{1,o}, \ldots, x_{nx,o}, y_{0,o}, y_{1,o}, \ldots, y_{ny,o})$ defined in a sub-dimensional space with coordinates $y_n$ and $x_m$ with $n \in S_{ny,Lv}$ and $m \in S_{nx,Lx}$.

In this case, the gradients $m_{yn}$ and $m_{xm}$ of the straight line to be used in equation (2) are essentially the first derivatives of $y_n$ and $x_m$, $n \in S_{ny,Ly}$ and $m \in S_{nx,Lx}$, for F with respect to $x_j$, $j \in S_{nx,Lx}$, i.e., $$m_{yn} = \frac{dy_n}{dx_j} \text{ and } m_{xn} = \frac{dx_m}{dx_j}.$$

Using these derivatives for the values of the gradients, $$m_{yn} = \frac{dy_n}{dx_j},$$

where $n \in S_{ny,Ly}$, and $$m_{xn} = \frac{dx_m}{dx_j},$$

where $m \in S_{nx,Lx}$, in equation (2) and noting that it is assumed that $$\frac{dx_m}{dx_j} = 0,$$

for $m \in (S_{nx} - S_{nx,Lx})$ and $$\frac{dy_n}{dx_j} = 0,$$

for $n \in (S_{ny} - S_{ny,Lx})$, then a solution for $x'_{j,3}$ may be obtained.

The values of $y'_{n,3}$ for $n \in S_{ny}$ and $x'_{m,3}$ for $m \in S_{nx}$ & $m \neq j$, can further be obtained for $x_j = x'_{j,3}$. The choice of the $x_m$-coordinates, $m \in S_{nx,Lx}$, and $y_n$-coordinates, $n \in S_{ny,Ly}$, which can be used to compute the tangent of the straight line in this case may be chosen at random or according to a pre-defined rule. Further, a different choice of the $x_m$-coordinates, $m \in S_{nx,Lx}$, and $y_n$-coordinates, $n \in S_{ny,Ly}$, may be made when one needs to compute successive point doublings, such as that needed in scalar multiplication.

With regard to the next case, Case B.i.2, the second possible way of defining the addition of a point with itself is to apply a sequence of the point doublings according to the rule defined above in Case B.i.1, where the rule is applied with a different selection of the x-coordinate(s) and y-coordinates(s) in each step of this sequence.

In the third sub-case, Case B.i.3, a point is substituted with one of its equivalents. Letting $(x_{0,oe}, x_{1,oe}, \ldots, x_{nx,oe}, y_{0,oe}, y_{1,oe}, \ldots, y_{ny,oe})$ represent the equivalent point of $(x_{0,o}, x_{1,o}, \ldots, x_{nx,o}, y_{0,o}, y_{1,o}, \ldots, y_{ny,o})$, then equation (3) may be written as:

$$(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,o}, y_{1,o}, \ldots, y_{ny,o}) + (x_{0,oe}, x_{1,oe}, \ldots, x_{nx,oe}, y_{0,oe}, y_{1,oe}, \ldots, y_{ny,oe}).$$

With regard to Case B.ii, for $k \in S_{ny}$ & $k \neq 0$, $y_{k,1} = y_{k,2}$, and where $y_{0,1}$ & $y_{0,2}$ are the roots of the quadratic equation in $y_0$, this case corresponds to generation of the point inverse.

Letting $y_{k,1} = y_{k,2} = y_{k,o}$ for $k \in S$ & $k \neq 0$, then any two points, such as the point $(x_{0,o}, x_{1,o}, \ldots, x_{nx,o}, y_{0,1}, y_{1,o}, \ldots, y_{ny,o}) \in EC^{nx+ny+2}$ and the point $(x_{0,o}, x_{1,o}, \ldots, x_{nx,o}, y_{0,2}, y_{1,o}, \ldots, y_{ny,o}) \in EC^{nx+ny+2}$, are in the hyper-plane with $x_i = x_{i,o}$, $i \in S_{nx}$ and $y_k = y_{k,o}$, $k \in S_{ny}$ & $k \neq 0$. Thus, any straight line joining these two points such that $(x_{0,o}, x_{1,o}, \ldots, x_{nx,o}, y_{0,1}, y_{1,o}, \ldots, y_{ny,o}) \neq (x_{0,o}, x_{1,o}, \ldots, x_{nx,o}, y_{0,2}, y_{1,o}, \ldots, y_{ny,o})$ is also in this hyper-plane.

Substituting the values of $x_{0,o}, x_{1,o}, \ldots, x_{nx,o}, y_{1,o}, \ldots,$ & $y_{ny,o}$ in an elliptic polynomial equation with multiple x-coordinates and multiple y-coordinates, a quadratic equation for $y_0$ is obtained, as given above. Thus, $y_0$ has only two solutions, $y_{0,1}$ & $y_{0,2}$.

Thus, a line joining points $(x_{0,o}, x_{1,o}, \ldots, x_{nx,o}, y_{0,1}, y_{1,o}, \ldots, y_{ny,o}) \in EC^{nx+ny+2}$ and $(x_{0,o}, x_{1,o}, \ldots, x_{nx,o}, y_{0,2}, y_{1,o}, \ldots, y_{ny,o}) \in EC^{nx+ny+2}$ does not intersect with $EC^{nx+ny+2}$ at a third point.

A line that joins these two points is assumed to intersect with $EC^{nx+ny+2}$ at infinity $(x_{0,1}, x_{1,1}, \ldots, x_{nx,1}, y_{0,1}, y_{1,1}, \ldots, y_{ny,1}) \in EC^{nx+ny+2}$. This point at infinity is used to define both the inverse of a point in $EC^{nx+ny+2}$ and the identity point. According to the addition rule defined above, one can write:

$$(x_0, x_1, \ldots, x_{nx}, y_{0,1}, y_1, \ldots, y_{ny}) + (x_0, x_1, \ldots, x_{nx}, y_{0,2}, y_1, \ldots, y_{ny}) = (x_{0,1}, x_{1,1}, \ldots, x_{nx,1}, y_{0,1}, y_{1,1}, \ldots, y_{ny,1}) \quad (4),$$

since the third point of intersection of such lines is assumed to be at infinity, $(x_{0,1}, x_{1,1}, \ldots, x_{nx,1}, y_{0,1}, y_{1,1}, \ldots, y_{ny,1}) \in EC^{nx+ny+2}$. Thus, this equation defines a unique inverse for any point $(x_0, x_1, \ldots, x_{nx}, y_0, y_1, \ldots, y_{ny}) \in EC^{nx+ny+2}$, namely:

$$-(x_0, x_1, \ldots, x_{nx}, y_{0,1}, y_1, \ldots, y_{ny}) = (x_0, x_1, \ldots, x_{nx}, y_{0,2}, y_1, \ldots, y_{ny}).$$

Thus, equation (4) can be written as:

$$(x_0, x_1, \ldots, x_{nx}, y_{0,1}, y_1, \ldots, y_{ny}) - (x_0, x_1, \ldots, x_{nx}, y_{0,1}, y_1, \ldots, y_{ny}) = (x_{0,1}, x_{1,1}, \ldots, x_{nx,1}, y_{0,1}, y_{1,1}, \ldots, y_{ny,1}) \quad (5).$$

Further, a line joining the point at infinity $(x_{0,1}, x_{1,1}, \ldots, x_{nx,1}, y_{0,1}, y_{1,1}, \ldots, y_{ny,1}) \in EC^{nx+ny+2}$ and a point $(x_0, x_1, \ldots, x_{nx}, y_{0,1}, y_1, \ldots, y_{ny}) \in EC^{nx+ny+2}$ will intersect with $EC^{nx+ny+2}$ at $(x_0, x_1, \ldots, x_{nx}, y_{0,2}, y_1, \ldots, y_{ny}) \in EC^{nx+ny+2}$. Thus, from the addition rule defined above, $$(x_0, x_1, \ldots, x_{nx}, y_0, y_1, y_2, \ldots, y_{ny}) + (x_{0,1}, x_{1,1}, \ldots, x_{nx}, y_{0,1}, y_{1,1}, \ldots, y_{ny,1}) = (x_0, x_1, \ldots, x_{nx}, y_0, y_1, \ldots, y_{ny}) \quad (6).$$

Equation (5) satisfies axiom (ii) while equation (6) satisfies axiom (i), defined above.

Case B.iii applies for all other conditions except those in cases B.i and B.ii. This case occurs only when ny is greater than or equal to one. Given two points $(x_{0,o}, x_{1,o}, \ldots, x_{nx,o}, y_{0,1}, y_{1,1}, \ldots, y_{ny,1}) \in EC^{nx+ny+2}$ and $(x_{0,o}, x_{1,o}, \ldots, x_{nx,o}, y_{0,2}, y_{1,2}, \ldots, y_{ny,2}) \in EC^{nx+ny+2}$ that do not satisfy the conditions of cases B.i and B.ii above, the sum point is written as $(x_{0,3}, x_{1,3}, \ldots, x_{nx,3}, y_{0,3}, y_{1,3}, \ldots, y_{ny,3}) = (x_{0,o}, x_{1,o}, \ldots, y_{0,1}, y_{1,1}, \ldots, y_{ny,1}) + (x_{0,o}, x_{1,o}, \ldots, x_{nx,o}, y_{0,2}, y_{1,2}, \ldots, y_{ny,2})$.

There are several possible rules to find the sum point in this case. Three possible methods are given below.

1) Using three point doublings and one point addition, $$(x_{0,2}, x_{1,3}, \ldots, x_{nx,3}, y_{0,3}, y_{1,3}, \ldots, y_{ny,3}) = 4(x_{0,o}, x_{1,o}, \ldots, x_{nx,o}, y_{0,1}, y_{1,1}, \ldots, y_{ny,1}) - 2(x_{0,o}, x_{1,o}, \ldots, x_{nx,o}, y_{0,2}, y_{1,2}, \ldots, y_{ny,2});$$

2) using one point doublings and three point additions, $$(x_{0,3}, x_{1,3}, \ldots, x_{nx,3}, y_{0,3}, y_{1,3}, \ldots, y_{ny,3}) = (2(x_{0,o}, x_{1,o}, \ldots, x_{nx,o}, y_{0,1}, y_{1,1}, \ldots, y_{ny,1}) + (x_{0,o}, x_{1,o}, \ldots, x_{nx,o}, y_{0,2}, y_{1,2}, \ldots, y_{ny,2})) - (x_{0,o}, x_{1,o}, \ldots, x_{nx,o}, y_{0,1}, y_{1,1}, \ldots, y_{ny,1}); \text{ and}$$

3) using point equivalence, $$(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,1}, y_{1,1}, \ldots, y_{ny,1}) + (x_{0,oe}, x_{1,oe}, \ldots, x_{nx,oe}, y_{0,2e}, y_{1,2e}, \ldots, y_{ny,2e}),$$

where $(x_{0,oe}, x_{1,oe}, \ldots, x_{nx,oe}, y_{0,2e}, y_{1,2e}, \ldots, y_{ny,2e})$ is assumed to be the equivalent point of $(x_{0,o}, x_{1,o}, \ldots, x_{nx,o}, y_{0,2}, y_{1,2}, \ldots, y_{ny,2})$.

It should be noted that the above methods for defining the sum point are not the only ones that can be defined and are provided for exemplary purposes only. The choice of method used to obtain the sum point in this case should depend on the computation complexity of point addition and point doubling.

With regard to associativity, one way of proving associativity of $(EC^{nx+ny+2}, +)$ is as follows: Given particular elliptic polynomial equations (i.e., for particular coefficients $a_{1l}, a_{2kl}, a_{3k}, c_{1lki}, c_{2kl}, c_{3kli}, b_{1l}, b_{2lk}, b_{3lk}, b_{4k}, b_c \in F$) defined over a finite field F, if it can be shown by computation that any point $Q \in EC^{nx+ny+2}$ (and any of its equivalent points) can be uniquely written as $k_Q P \in EC^{nx+ny+2}$, where P is the generator point of $(EC^{nx+ny+2}, +)$, then the corresponding $EC^{nx+ny+2}$ groups based on such polynomials are associative. This is because any three points $Q, R, S \in EC^{nx+ny+2}$ (or any of their equivalent points) can be written as $k_Q P, k_R P, k_S P \in EC^{nx+ny+2}$, respectively, thus their sum $(Q+R+S) = (k_Q P + k_R P + k_S P) = (k_Q + k_R + k_S) P$ can be carried out in any order.

The following elliptic polynomial equation with $nx=1$ and $ny=0$ is used to show an example of the equations in Case A used in point addition: $y_0^2 = x_0^3 + x_1^3 + x_0 x_1$. Choosing $x_j = x_0$, and substituting $y_k = m_{yk} x_j + c_{yk}$ from Case A above for $y_0$, and the corresponding equation $x_i = m_{xi} x_j + c_{xi}$ for $x_1$, one obtains $(m_{y0} x_0 + c_{y0})^2 = x_0^3 + (m_{x1} x_0 + c_{x1})^3 + x_0 (m_{x1} x_0 + c_{x1})$.

Expanding this equation yields the equation $m_{y0}^2 x_0^2 + 2m_{y0} c_{y0} x_0 + c_{y0}^2 = x_0^3 + m_{x1}^3 x_0^3 + 3 m_{x1}^2 c_{x1} x_0^2 + 3 m_{x1} c_{x1}^2 x_0 + c_{x1}^3 + m_{x1} x_0^2 + c_{x1} x_0$, or $(1 + m_{x1}^3) x_0^3 + (3 m_{x1}^2 c_{x1} + m_{x1} - m_{y0}^2) x_0^2 + (3 m_{x1} c_{x1}^2 + c_{x1} - 2 m_{y0} c_{y0}) x_0 + c_{x1}^3 - c_{y0}^2 = 0$. From equation (2), the solution for $x'_{0,3}$ in this case is obtained:

$$x'_{0,3} = \frac{-(3 m_{x1}^2 c_{x1} + m_{x1} - m_{y0}^2)}{(1 + m_{x1}^3)} - x_{j,1} - x_{j,2}.$$

Similarly, one can obtain the values of $y'_{0,3}$ and $x'_{1,3}$ for $x_0 = x'_{0,3}$.

It should be noted that when $m_{x1} = -1$, the coefficient of the cubic term in the above is zero; i.e. $C_3 = 0$. In this case, the resulting quadratic equation can be used in the definition of point equivalences for the points that satisfy the elliptic polynomial equation.

Each of the equations for point addition and point doublings derived for cases A and B above require modular inversion or division. In cases where field inversions or divisions are significantly more expensive (in terms of computational time and energy) than multiplication, projective coordinates are used to remove the requirement for field inversion or division from these equations.

Several projective coordinates can be utilized. In the preferred embodiment, the Jacobean projective coordinate system is used. As an example, we examine:

$$x_i = \frac{X_i}{V^2} \text{ for } i \in S_{nx}; \text{ and; and} \qquad (7)$$

$$y_k = \frac{Y_k}{V^3} \text{ for } k \in S_{ny}. \qquad (8)$$

Using Jacobian projection yields:

$$\sum_{k \in S_{ny}} a_{1k} \frac{Y_k^2}{V^6} + \sum_{k,l \in S_{ny}, l \neq k} a_{2kl} \frac{Y_k}{V^3} \frac{Y_l}{V^3} + \sum_{k \in S_{ny}} a_{3k} \frac{Y_k}{V^3} + \qquad (9)$$

$$\sum_{k,l \in S_{ny}, i \in S_{nx}} c_{1kli} \frac{Y_k}{V^3} \frac{Y_l}{V^3} \frac{X_i}{V^2} + \sum_{k,l \in S_{ny}, l \in S_{nx}} c_{2kl} \frac{Y_k}{V^3} \frac{Y_l}{V^2} +$$

$$\sum_{k,l \in S_{ny}, l,i \in S_{nx}} c_{3kli} \frac{Y_k}{V^3} \frac{X_l}{V^2} \frac{X_i}{V^2} = \sum_{l \in S_{nx}} b_{1l} \frac{X_l^3}{V^6} +$$

$$\sum_{k,l \in S_{nx}, l \neq k} b_{2lk} \frac{X_l^2}{V^4} \frac{X_k}{V^2} + \sum_{k,l \in S_{nx}} b_{3lk} \frac{X_l}{V^2} \frac{X_k}{V^2} + \sum_{k \in S_{nx}} b_{4k} \frac{X_k}{V^2} + b_c$$

which can be rewritten as:

$$\sum_{k \in S_{ny}} a_{1k} Y_k^2 V^2 + \sum_{k,l \in S_{ny}, l \neq k} a_{2kl} Y_k Y_l V^2 + \qquad (10)$$

$$\sum_{k \in S_{ny}} a_{3k} Y_k V^5 + \sum_{k,l \in S_{ny}, i \in S_{nx}} c_{1kli} Y_k Y_l X_i +$$

$$\sum_{k,l \in S_{ny}, l \in S_{nx}} c_{2kl} Y_k X_l V^3 + \sum_{k,l \in S_{ny}, l,i \in S_{nx}} c_{3kli} Y_k X_l X_i V =$$

$$\sum_{l \in S_{nx}} b_{1l} X_l^3 V^2 + \sum_{l,k \in S_{nx}, l \neq k} b_{2lk} X_l^2 X_k V^2 +$$

$$\sum_{l,k \in S_{nx}} b_{3lk} X_l X_k V^4 + \sum_{k \in S_{nx}} b_{4k} X_k V^6 + b_c V^8.$$

In the following, the points $(X_0, X_1, \ldots, X_{nx}, Y_0, Y_1, \ldots, Y_{ny}, V)$ are assumed to satisfy equation (10). When $V \neq 0$, the projected point $(X_0, X_1, \ldots, X_{nx}, Y_0, Y_1, \ldots, Y_{ny}, V)$ corresponds to the point:

$$(x_0, x_1, \ldots, x_{nx}, y_0, y_1, \ldots, y_{ny}) = \left( \frac{X_0}{V^2}, \frac{X_1}{V^2}, \ldots, \frac{X_{nx}}{V^2}, \frac{Y_0}{V^3}, \frac{Y_1}{V^3}, \ldots, \frac{Y_{ny}}{V^3} \right),$$

which satisfies equation (1).

Using Jacobean projective coordinates, equation (10) can be written as:

$$\left( \frac{X_{0,3}}{V_3^2}, \frac{X_{1,3}}{V_3^2}, \ldots, \frac{X_{nx,3}}{V_3^2}, \frac{Y_{0,3}}{V_3^3}, \frac{Y_{1,3}}{V_3^3}, \ldots, \frac{Y_{ny,3}}{V_3^3} \right) = \qquad (11)$$

$$\left( \frac{X_{0,1}}{V_1^2}, \frac{X_{1,1}}{V_1^2}, \ldots, \frac{X_{nx,1}}{V_1^2}, \frac{Y_{0,1}}{V_1^3}, \frac{Y_{1,1}}{V_1^3}, \ldots, \frac{Y_{ny,1}}{V_1^3} \right) +$$

$$\left( \frac{X_{0,2}}{V_2^2}, \frac{X_{1,2}}{V_2^2}, \ldots, \frac{X_{nx,2}}{V_2^2}, \frac{Y_{0,2}}{V_2^3}, \frac{Y_{1,2}}{V_2^3}, \ldots, \frac{Y_{ny,2}}{V_2^3} \right).$$

By using Jacobian projective coordinates in the equations of Cases A and B above, and by an appropriate choice of the value of $V_3$, it can be shown that point doubling and point addition can be computed without the need for field inversion or division.

As described above, conventional bit string embedding into an elliptic curve point involves an iterative algorithm to search for an x-coordinate value which will lead to a quadratic residue value of the y-coordinate starting from an initial x-coordinate value specified by the bit string to be embedded. However, such a process requires that the number of iterations needed is different for different bit strings that are being embedded. In the present method, an embedding methodology is utilized that embeds a bit string into an appropriate elliptic polynomial point with (nx+1) x-coordinates and (ny+1) y-coordinates in a deterministic and non-iterative manner. Further, the elliptic polynomial equation is of a specified form, i.e., it is isomorphic to its twist. This method circumvents the need for an iterative algorithm that involves the usual search for a quadratic residue value of the y-coordinate (which typically requires several iterations) and, further, suffers from the drawback that the number of iterations needed is different for different bit strings that are being embedded.

In order to examine the embedding method, the twist of an elliptic polynomial equation needs to be defined. Given an elliptic polynomial with (nx+1) x-coordinates and (ny+1) y-coordinates of the form described above:

$$y_0^2 + \sum_{k \in S_{ny}} a_{1k} y_k^2 + \sum_{k,l \in S_{ny}, l \neq k} a_{2kl} y_k y_l = \sum_{l \in S_{nx}} b_{1l} x_l^3 + \sum_{l,k \in S_{nx}, l \neq k} b_{2lk} x_l^2 x_k, \quad (12)$$

where $a_{1l}, a_{2kl}, b_{1l}, b_{2lk} \in F$.

Given certain values for the x-coordinates $x_{0,o}, x_{1,o}, \ldots, x_{nx,o}$ and y-coordinates $y_{1,o}, \ldots, y_{ny,o}$, respectively, that are elements of the finite field, F, these values are substituted into the elliptic polynomial equation (1) in order to obtain a quadratic equation in $y_0$:

$$y_0^2 = -\sum_{k \in S_{ny}} a_{1k} y_{k,o}^2 - \sum_{k,l \in S_{ny}, l \neq k} a_{2kl} y_{k,o} y_{l,o} + \sum_{l \in S_{nx}} b_{1l} x_{l,o}^3 + \sum_{l,k \in S_{nx}, l \neq k} b_{2lk} x_{l,o}^2 x_{k,o}$$
$$= T.$$

If a solution of the above quadratic equation (i.e., $y_0^2 = T$) is an element of the finite field F, the point $(x_{0,o}, x_{1,o}, \ldots, x_{nx,o}, y_0, y_{1,o}, \ldots, y_{ny,o})$ is said to satisfy the given elliptic polynomial equation. If a solution of the above quadratic equation is not an element of the finite field F, the point $(x_{0,o}, x_{1,o}, \ldots, x_{nx,o}, y_0, y_{1,o}, \ldots, y_{ny,o})$ is said to satisfy the twist of the given elliptic curve equation. The inventive embedding method is based on the isomorphic relationship between a curve and its twist as described in the following theorem:

An elliptic polynomial equation of the form given above is isomorphic to its twist if:
1) there are mathematical mappings that can be defined on the values of $x_0, x_1, \ldots, x_{nx}, y_1, \ldots, y_{ny}$ (i.e., $\phi_x(x_i)$ and $\phi_y(y_i)$) such that any point $(x_0, x_1, \ldots, x_{nx}, y_0, y_1, \ldots, y_{ny})$ that satisfies such an elliptic polynomial equation can be mapped into another point $(\phi_x(x_0), \phi_x(x_1), \ldots, \phi_x(x_{xn}), \phi_y(y_0), \phi_y(y_1), \ldots, \phi_y(y_{ny}))$ that satisfies the twist of the same elliptic polynomial equation; and
2) the mapping between the points $(x_0, x_i, \ldots, x_{nx}, y_0, y_1, \ldots, y_{ny})$ and $(\phi_x(x_0), \phi_x(x_1), \ldots, \phi_x(x_{xn}), \phi_y(y_0), \phi_y(y_1), \ldots, \phi_y(y_{ny}))$ is unique, i.e., a one-to-one correspondence.

The proof of this theorem is as follows. Re-writing equation (12) as:

$$y_0^2 = -\sum_{k \in S_{ny}} a_{1k} y_k^2 - \sum_{k,l \in S_{ny}, l \neq k} a_{2kl} y_k y_l + \sum_{l \in S_{nx}} b_{1l} x_l^3 + \sum_{l,k \in S_{nx}, l \neq k} b_{2lk} x_l^2 x_k, \quad (13)$$

and letting the right-hand side of equation (13) be denoted as T, then:

$$T = -\sum_{k \in S_{ny}} a_{1k} y_k^2 - \sum_{k,l \in S_{ny}, l \neq k} a_{2kl} y_k y_l + \sum_{l \in S_{nx}} b_{1l} x_l^3 + \sum_{l,k \in S_{nx}, l \neq k} b_{2lk} x_l^2 x_k. \quad (14)$$

Thus, any value of $x_0, x_1, \ldots, x_{nx}, y_1, \ldots, y_{ny}$ will lead to a value of $T \in F(p)$. T could be quadratic residue or non-quadratic residue. If T is quadratic residue, then equation (14) is written as:

$$T_q = -\sum_{k \in S_{ny}} a_{1k} y_{k,q}^2 - \sum_{k,l \in S_{ny}, l \neq k} a_{2kl} y_{k,q} y_{l,q} + \sum_{l \in S_{nx}} b_{1l} x_{l,q}^3 + \sum_{l,k \in S_{nx}, l \neq k} b_{2lk} x_{l,q}^2 x_{k,q} \quad (15)$$

where $x_{0,q}, x_{1,q}, \ldots, x_{nx,q}, y_{1,q}, \ldots, y_{ny,q} \in F$ denotes the values of $x_0, x_1, \ldots, x_{nx}, y_1, \ldots, y_{ny}$ that result in a quadratic residue value of T, which is hereafter denoted as $T_q$.

If T is non-quadratic residue, then equation (14) is written as:

$$T_{\bar{q}} = -\sum_{k \in S_{ny}} a_{1k} y_{k,\bar{q}}^2 - \sum_{k,l \in S_{ny}, l \neq k} a_{2kl} y_{k,\bar{q}} y_{l,\bar{q}} + \sum_{l \in S_{nx}} b_{1l} x_{l,\bar{q}}^3 + \sum_{l,k \in S_{nx}, l \neq k} b_{2lk} x_{l,\bar{q}}^2 x_{k,\bar{q}} \quad (16)$$

where $x_{0,\bar{q}}, x_{1,\bar{q}}, \ldots, x_{nx,\bar{q}}, y_{1,\bar{q}}, \ldots, y_{ny,\bar{q}} \in F$ denotes the values of $x_0, x_1, \ldots, x_{nx}, y_1, \ldots, y_{ny}$ that result in a non-quadratic residue value of T, denoted as $T_{\bar{q}}$.

Letting g be any non-quadratic residue number in F (i.e., $g \in F(p)$ & $\sqrt{g} \in F(p)$), then multiplying equation (15) with $g^3$ yields:

$$g^3 T_q = -g^3 \sum_{k \in S_{ny}} a_{1k} y_{k,q}^2 - g^3 \sum_{k,l \in S_{ny}, l \neq k} a_{2kl} y_{k,q} y_{l,q} + g^3 \sum_{l \in S_{nx}} b_{1l} x_{l,q}^3 + g^3 \sum_{l,k \in S_{nx}, l \neq k} b_{2lk} x_{l,q}^2 x_{k,q},$$

which can be re-written as:

$$g^3 T_q = \quad (17)$$
$$-\sum_{k \in S_{ny}} a_{1k} \left(\sqrt{g^3}\, y_{k,q}\right)^2 - \sum_{k,l \in S_{ny}, l \neq k} a_{2kl} g^3 \left(\sqrt{g^3}\, y_{k,q}\right)\left(\sqrt{g^3}\, y_{l,q}\right) +$$

-continued $$\sum_{l \in S_{nx}} b_{1l}(gx_{l,q})^3 + \sum_{l,k \in S_{nx}, l \neq k} b_{2lk}(gx_{l,q})^2(gx_{k,q}).$$

It should be noted that if g is non-quadratic residue, then $g^3$ is also non-quadratic residue. Further, the result of multiplying a quadratic residue number by a non-quadratic residue number is a non-quadratic residue number. Thus, $g^3 T_q$ is non-quadratic residue.

By comparing the terms of equations (16) and (17), we obtain the following mappings:

$$x_{i,\bar{q}} = gx_{i,q} \quad (18);$$

$$y_{i,\bar{q}} = \sqrt{g^3} y_{i,q} \quad (19); \text{ and}$$

$$T_{\bar{q}} = g^3 T_q \quad (20).$$

The mappings between the variables $x_{i,q}$ and $x_{i,\bar{q}}$ in equation (18), $y_{i,q}$ and $y_{i,\bar{q}}$ in equation (19), and $T_q$ and $T_{\bar{q}}$ in equation (20) are all bijective, i.e., there is a one-to-one correspondence from basic finite field arithmetic. As a consequence, the mappings between the (nx+ny+2)-tuple $(x_{0,q}, x_{1,q}, \ldots, x_{nx,q}, T_q, y_{1,q}, \ldots, y_{ny,q})$ and the (nx+ny+2)-tuple $(x_{0,\bar{q}}, x_{1,\bar{q}}, \ldots, x_{nx,\bar{q}}, T_{\bar{q}}, y_{1,\bar{q}}, \ldots, y_{ny,\bar{q}})$ are also bijective.

Therefore, for every solution of equation (15), there is an isomorphic solution that satisfies equation (16), and since the mappings of the coordinates of one to the other are given in equations (18)-(20), these two solutions are isomorphic with respect to each other.

Since $T_q$ is quadratic residue, this expression can be written as:

$$T_q = y_0^2 \quad (21)$$

Thus, from equation (20), $T_{\bar{q}}$ can be written as:

$$T_{\bar{q}} = g^3 y_0^2 \quad (22).$$

Using equations (21) and (22), equations (15) and (16) can be written as:

$$y_0^2 = -\sum_{k \in S_{ny}} a_{1k} y_{k,q}^2 - \sum_{k,l \in S_{ny}, l \neq k} a_{2kl} y_{k,q} y_{l,q} + \quad (23)$$

$$\sum_{l \in S_{nx}} b_{1l} x_{l,q}^3 + \sum_{l,k \in S_{nx}, l \neq k} b_{2lk} x_{l,q}^2 x_{k,q};$$

and $$g^3 y_0^2 = -\sum_{k \in S_{ny}} a_{1k} y_{k,\bar{q}}^2 - \sum_{k,l \in S_{ny}, l \neq k} a_{2kl} y_{k,\bar{q}} y_{l,\bar{q}} + \quad (24)$$

$$\sum_{l \in S_{nx}} b_{1l} x_{l,\bar{q}}^3 + \sum_{l,k \in S_{nx}, l \neq k} b_{2lk} x_{l,\bar{q}}^2 x_{k,\bar{q}}.$$

Since any solution of equation (15) has an isomorphic solution that satisfies equation (16), it follows that the solution of equation (23), denoted as $(x_{0,q}, x_{1,q}, \ldots, x_{nx,q}, y_0, y_1, \ldots, y_{ny,q})$, has an isomorphic solution that satisfies equation (24), denoted as $(gx_{0,q}, gx_{1,q}, \ldots, gx_{nx,q}, g^{3/2} y_0, g^{3/2} y_{1,q}, \ldots, g^{3/2} y_{ny,q})$.

The solutions of equation (23) form the points $(x_{0,q}, x_{1,q}, \ldots, x_{nx,q}, y_0, y_{1,q}, \ldots, y_{ny,q})$ that satisfy an elliptic polynomial. Similarly, the solutions of equation (24) form the points $(gx_{0,q}, gx^{1,q}, \ldots, gx_{nx,q}, g^{3/2} y_0, g^{3/2} y_{1,q}, \ldots, g^{3/2} y_{ny,q})$ that satisfy its twist. This proves the above theorem.

An example of a mapping of the solutions of equation (23) defined over F(p), where p≡3 mod 4, to the solutions of its twist is implemented by using $-x_i$ for the x-coordinates and $-y_i^2$ for the y-coordinates.

The isomorphism between an elliptic polynomial and its twist, discussed above, is exploited for the embedding of the bit sting of a shared secret key into the appropriate x and y coordinates of an elliptic polynomial point without the need for an iterative search for a quadratic residue value of the corresponding $y_0$-coordinate, which usually requires several iterations, where the number of iterations needed is different for different bit strings which are being embedded.

Assuming F=F(p) and that the secret key is an M-bit string such that (nx+ny+1)N>M>N−1, where N is the number of bits needed to represent the elements of F(p), then the secret key bit string is divided into (nx+ny+1) bit-strings $k_{x,0}, k_{x,1}, \ldots, k_{x,nx}, k_{y,1}, \ldots, k_{k,ny}$. The value of the bit-strings $k_{x,0}, k_{x,1}, \ldots, k_{x,nx}, k_{y,1}, \ldots, k_{k,ny}$ must be less than p. In the preferred embodiment of embedding the (nx+ny+1) bit-strings $k_{x,0}, k_{x,1}, \ldots, k_{x,nx}, k_{y,1}, \ldots, k_{k,ny}$, the embedding is as follows.

First, assign the value of the bit string of $k_{x,0}, k_{x,1}, \ldots, k_{x,nx}$ to $x_{0,k}, x_{1,k}, \ldots, x_{nx,k}$. Next, assign the value of the bit string of $k_{y,1}, \ldots, k_{k,ny}$ to $y_{1,k}, \ldots, y_{ny,k}$. Then, compute:

$$T = -\sum_{i \in S_{ny}} a_{1i} y_{i,m}^2 - \sum_{i,l \in S_{ny}, l \neq i} a_{2il} y_{i,m} y_{l,m} + \sum_{l \in S_{nx}} b_{1l} x_{l,m}^3 + \sum_{l,i \in S_{nx}, l \neq i} b_{2li} x_{l,m}^2 x_{i,m}.$$

Finally, use the Legendre test to see if T has a square root. If T has a square root, assign one of the roots to $y_0$; otherwise, the x-coordinates and y-coordinates of the elliptic polynomial point with the embedded shared secret key bit string are given by $gx_{i,k}$ and $g^{3/2} y_{i,k}$, respectively, where g is non-quadratic residue in F.

It should be noted that p is usually predetermined prior to encryption, so that the value of g can also be predetermined. Further, the receiver can identify whether the point $(x_{0,k}, x_{1,k}, \ldots, x_{nx,k}, y_{0,k}, y_{1,k}, \ldots, y_{ny,k})$ or the point $(gx_{0,k}, gx_{1,k}, \ldots, gx_{nx,k}, g^{3/2} y_{0,k}, g^{3/2} y_{1,k}, \ldots, g^{3/2} y_{ny,k})$ is the elliptic polynomial point with the embedded secret key bit strings without any additional information. Additionally, any non-quadratic value in F(p) can be used for g. For efficiency, g is chosen to be −1 for p≡3 mod 4 and g is chosen to be 2 for p≡1 mod 4.

The same deterministic and non-iterative method described above can be used to embed a secret message bit string into an elliptic polynomial point in a deterministic and non-iterative manner. Assuming F=F(p) and that the message is an M-bit string such that (nx+ny+1)N>M>N−1, where N is the number of bits needed to represent the elements of F(p), then the message bit string is divided into (nx+ny+1) bit-strings $m_{x,0}, m_{x,1}, \ldots, m_{x,nx}, m_{y,1}, \ldots, m_{k,ny}$. The value of the bit-strings $m_{x,0}, m_{x,1}, \ldots, m_{x,nx}, m_{y,1}, \ldots, m_{k,ny}$ must be less than p. As in the previous embodiment, the embedding of the (nx+ny+1) bit-strings $m_{x,0}, m_{x,1}, \ldots, m_{x,nx}, m_{y,1}, \ldots, m_{k,ny}$ can be accomplished out as follows.

First, assign the value of the bit string of $m_{x,0}, m_{x,1}, \ldots, m_{x,nx}$ to $x_{0,m}, x_{1,m}, \ldots, x_{nx,m}$. Next, assign the value of the bit string of $m_{y,1}, \ldots, m_{k,ny}$ to $y_{1,m}, \ldots, y_{ny,m}$. Then compute:

$$T = -\sum_{i \in S_{ny}} a_{1i} y_{i,m}^2 - \sum_{i,l \in S_{ny}, l \neq i} a_{2il} y_{i,m} y_{l,m} + \sum_{l \in S_{nx}} b_{1l} x_{l,m}^3 + \sum_{l,i \in S_{nx}, l \neq i} b_{2li} x_{l,m}^2 x_{i,m}.$$

Finally, use the Legendre test to see if T has a square root. If T has a square root, then assign one of the roots to $y_0$, otherwise the x-coordinates and y-coordinates of the elliptic polynomial point with the embedded shared secret key bit string are given by $gx_{i,m}$ and $g^{3/2}y_{i,m}$, respectively.

It should be noted that p is usually predetermined prior to encryption; thus, the value of g can also be predetermined. Further, when using the above method, the strings $m_{x,0}$, $m_{x,1}, \ldots, m_{x,nx}$ and $m_{y,1}, \ldots, m_{k,ny}$ can be recovered directly from $x_{0,m}, x_{1,m}, \ldots, x_{nx,m}$ and $y_{1,m}, \ldots, y_{ny,m}$, respectively. An extra bit is needed to identify whether $(x_{0,m}, x_{1,m}, \ldots, x_{nx,m}, y_{0,m}, y_{1,m}, \ldots, y_{ny,m})$ or $(gx_{0,m}, gx_{1,m}, \ldots, gx_{nx,m}, g^{3/2}y_{0,m}, g^{3/2}y_{1,m}, \ldots, g^{3/2}y_{ny,m})$ is used at the sending correspondent. Additionally, any non-quadratic value in F(p) can be used for g. For efficiency, g is chosen to be −1 for p≡3 mod 4 and is chosen to be 2 for p≡1 mod 4. Further, at the receiver, the process is reversed. In the case of g=2, a division by two is carried out. It should noted that dividing $x_{i,m}$ by two is computed using one modulo addition, because:

(i) $x_{i,m}/2=((x_{i,m}-(x_{i,m}) \mod 2)/2)+(x_{i,m}) \mod 2*(½) \mod p$;
(ii) $(x_{1,m}) \mod 2$ is the least significant bit of $x_{i,m}$; and
(iii) $(½) \mod p = (p+1)/2$.

The following describes the mapping of points that satisfy one elliptic polynomial to points that satisfy another elliptic polynomial. The two elliptic polynomials are not required to be isomorphic with respect to each other. This mapping is used for "hopping" between elliptic polynomials.

The type of elliptic polynomial used for such mapping of points has the following form. The elliptic polynomial is a polynomial with more than two independent variables such that one of the variables, termed the y-coordinate, has a maximum degree of two, and appears on its own in only one of the monomials. The other variables, termed the x-coordinates, have a maximum degree of three, and each must appear in at least one of the monomials with a degree of three. Finally, all monomials that contain x-coordinates must have a total degree of three.

Letting $S_{nx}$ represent the set of numbers from 0 to nx (i.e., $S_{nx}=\{0, \ldots, nx\}$), then given a finite field F and denoting $b_{1l}^{(s)}, b_{2lk}^{(s)} \in F$ as the coefficients of the s-th elliptic polynomial, the following equation defined over F is an example of such an elliptic polynomial:

$$y^2 = \sum_{l \in S_{nx}} b_{1l}^{(s)} x_l^3 + \sum_{l,k \in S_{nx}, l \neq k} b_{2lk}^{(s)} x_l^2 x_k. \quad (25)$$

The following equations are examples of equation (25):

$$y^2 = b_{10}^{(s)} x_0^3 + b_{11}^{(s)} x_1^3 + b_{201}^{(s)} x_0^2 x_1 \quad (26)$$

$$y_o^2 = b_{10}^{(s)} x_0^3 + b_{11}^{(s)} x_1^3 + b_{201}^{(s)} x_0^2 x_1 + b_{210}^{(s)} x_1^2 x_0 \quad (27).$$

Given an elliptic polynomial, such as that given above in equation (25), with coefficients $b_{1l}, b_{2lk} \in F$, then $(x_{0,o}^{(s)}, x_{0,o}^{(s)}, \ldots, x_{nx,o}^{(s)}, y_o^{(s)})$ is denoted as a point that satisfies the s-th elliptic polynomial. Given another elliptic polynomial that is denoted the r-th polynomial, with coefficients $b_{1l}^{(r)}, b_{2lk}^{(r)} \in F$, then $$y^2 = \sum_{l \in S_{nx}} b_{1l}^{(r)} x_l^3 + \sum_{l,k \in S_{nx}, l \neq k} b_{2lk}^{(r)} x_l^2 x_k,$$

where the r-th elliptic polynomial is not necessarily isomorphic to the s-th elliptic polynomial, i.e., where all or some of the coefficients $b_{1l}^{(r)}, b_{2lk}^{(r)} \in F$ are different and independent of the coefficients $b_{1l}^{(s)}, b_{2lk}^{(s)} \in F$.

Elliptic polynomial hopping refers to hopping the point $(x_{0,o}^{(s)}, x_{0,o}^{(s)}, \ldots, x_{nx,o}^{(s)}, y_o^{(s)})$ that satisfies the one elliptic polynomial (for example, the s-th elliptic polynomial with coefficients $b_{1l}^{(s)}, b_{2lk}^{(s)} \in F$) into an equivalent point $(x_{0,o}^{(r)}, x_{0,o}^{(r)}, \ldots, x_{nx,o}^{(r)}, y_o^{(r)})$ that satisfies the r-th elliptic polynomial with coefficients $b_{1l}^{(r)}, b_{2lk}^{(r)} \in F$.

One method of achieving this is as follows. First, set the x-coordinates of the hopped point $x_{0,o}^{(r)}, x_{1,o}^{(r)}, \ldots, x_{nx,o}^{(r)}$ to the x-coordinates $x_{0,o}^{(s)}, x_{1,o}^{(s)}, \ldots, x_{nx,o}^{(s)}$ of the original point, $x_{i,o}^{(r)} = x_{i,o}^{(s)}$ for $i=0, \ldots, nx$. Next, substitute the value of the x-coordinates $x_{0,o}^{(r)}, x_{1,o}^{(r)}, \ldots, x_{nx,o}^{(r)}$ into the new elliptic polynomial equation to obtain $$T^{(r)} = \sum_{l \in S_{nx}} b_{1l}^{(r)} (x_l^{(r)})^3 + \sum_{l,k \in S_{nx}, l \neq k} b_{2lk}^{(r)} (x_l^{(r)})^2 x_k^{(r)}$$

(any value of $x_{0,o}^{(r)}, x_{1,o}^{(r)}, \ldots, x_{nx,o}^{(r)}$ will lead to a value of $T^{(r)} \in F(p)$, where $T^{(r)}$ could be quadratic residue or non-quadratic residue). Finally, if $T^{(r)}$ is quadratic residue, set $y_o^{(r)} = \sqrt{T^{(r)}}$ and the hopped point is given by $(x_{0,o}^{(r)}, x_{1,o}^{(r)}, \ldots, x_{nx,o}^{(r)}, y_o^{(r)})$; otherwise, if $T^{(r)}$ is a non-quadratic residue, set) $y_o^{(r)} = \sqrt{g^3 T^{(r)}}$ and the hopped point is given by $(gx_{0,o}^{(r)}, gx_{1,o}^{(r)}, \ldots, gx_{nx,o}^{(r)}, y_{0,o}^{(r)})$.

Thus, any point that satisfies an elliptic polynomial can be hopped to an equivalent point on another elliptic polynomial, even if the two polynomials are not isomorphic to each other.

Further, a point is never mapped to another point that satisfies the twist of another elliptic polynomial. As can be seen in the final step above, a point that satisfies an elliptic polynomial is mapped (hopped) to another point that satisfies another elliptic polynomial. Any point that satisfies one elliptic polynomial can be uniquely mapped to another point that satisfies either the equation of an elliptic polynomial or the equation of its twist. In order to show this unique mapping, an additional "-tuple" must be used to indicate as to whether a point that satisfies an elliptic polynomial is mapped to point on another elliptic polynomial or the twist of this other elliptic polynomial.

Thus, for purposes of point mapping between one elliptic polynomial into another, a point is represented as $(x_{0,o}^{(s)}, x_{1,o}^{(s)}, \ldots, x_{nx,o}^{(s)}, y_o^{(s)}, \alpha_o^{(s)})$. The last variable, $\alpha_o^{(s)}$, indicates whether the point $(x_{0,o}^{(s-1)}, x_{1,o}^{(s-1)}, \ldots, x_{nx,o}^{(s-1)}, y_o^{(s-1)}, \alpha_o^{(s-1)})$ that satisfies the previous elliptic polynomial was mapped to an elliptic polynomial or its twist. If $\alpha_o(s)=1$, the point $(x_{0,o}^{(s-1)}, x_{1,o}^{(s-1)}, \ldots, x_{nx,o}^{(s-1)}, y_o^{(s-1)}, \alpha_o^{(s-1)})$ was originally mapped to a point on the elliptic polynomial, otherwise if $\alpha_o^{(s)}=g$, the point $(x_{0,o}^{(s-1)}, x_{1,o}^{(s-1)}, \ldots, x_{nx,o}^{(s-1)}, y_o^{(s-1)}, \alpha_o^{(s-1)})$ was mapped to a point on the twist of an elliptic polynomial. The addition of the variable $\alpha^{(s)}$ as an extra "-tuple" in the representation of points allows the above procedure to be reversed as follows.

First $\alpha_o^{(s)}=1$, the x-coordinates $x_{0,o}^{(s-1)}, x_{1,o}^{(s-1)}, \ldots, x_{nx,o}^{(s-1)}$ are given by $x_{i,o}^{(s-1)} = x_{i,o}^{(s)}$ for $i=0, \ldots, nx$; otherwise, if $\alpha_o^{(s)}=g$, the x-coordinates $x_{0,o}^{(s-1)}, x_{1,o}^{(s-1)}, \ldots, x_{nx,o}^{(s-1)}$ are given by $x_{i,o}^{(s-1)} = g^{-1} x_{i,o}^{(s)}$ for $i=0, \ldots, nx$. Next, substitute the value of the x-coordinates $x_{0,o}^{(s-1)}, x_{1,o}^{(s-1)}, \ldots, x_{nx,o}^{(s-1)}$ into the (s-1) elliptic polynomial equation to obtain $$T^{(s-1)} = \sum_{l \in S_{nx}} b_{1l}^{(s-1)} (x_l^{(s-1)})^3 + \sum_{l,k \in S_{nx}, l \neq k} b_{2lk}^{(s-1)} (x_l^{(s-1)})^2 x_k^{(s-1)}.$$

Finally, compute $y_o^{(s-1)} = \sqrt{T^{(s-1)}}$, since it is known that the original point $(x_{0,o}^{(s-1)}, x_{1,o}^{(s-1)}, \ldots, x_{nx,o}^{(s-1)}, y_o^{(s-1)}, \alpha_o^{(s-1)})$ must satisfy the equation of an elliptic polynomial. Thus, $T^{(s-1)}$ is always a quadratic residue.

It should be noted that in the above procedures, the value of $\alpha_o^{(s-1)}$ is not defined, since the value depends on the mapping of the point that satisfies the (s−2) elliptic polynomial into the (s−1) elliptic polynomial. This value of $\alpha_o^{(s-1)}$ must be provided as additional information.

The preferred embodiment of the present method includes the following steps:

a) defining a maximum block size that can be embedded into (nx+1) x-coordinates and nyy-coordinates, wherein n is an integer, and setting the maximum block size to be (nx+ny+1)N bits, wherein N is an integer;

b) a sending correspondent and a receiving correspondent agree upon the values of nx and ny, and further agree on a set of coefficients a,b∈F, wherein F represents a finite field where the field's elements can be represented in N-bits, the sending and receiving correspondents further agreeing upon a random number $k_0$, which is at least part of a shared secret key for communication, a random number generator, a random number $kp_0$ that is a portion of the shared secret key used for communication, and a set of (nx+1) numbers such that $xb_i \in F$, wherein i and nx are integers, wherein i=0, . . . , nx, the set being used to find an initial base point, the set being made public;

the sending correspondent then performs the following steps:

c) generating at least a portion of a set of coefficients $b_{1l}^{(0)}, b_{2lk}^{(0)} \in F$ of a first elliptic polynomial to be used for a message authentication code of a 0-th message block from the shared secret key $kp_0$;

d) embedding the set of (nx+1) numbers $xb_i \in F$ into an elliptic polynomial point to obtain an initial base point $(x_{0,B}^{(0)}, x_{1,B}^{(0)}, \ldots, x_{nx,B}^{(0)}, y_B^{(0)}, \alpha_B)$ using a data embedding method;

e) embedding the 0-th block of the message bit string into an elliptic polynomial message point $(x_{0,m}^{(0)}, x_{1,m}^{(0)}, \ldots, x_{nx,m}^{(0)}, y_m^{(0)}, \alpha_m^{(0)})$ using the data embedding method;

f) computing a scalar multiplication of the 0-th block shared key $k_0$ with the basepoint $(x_{0,B}^{(0)}, x_{1,B}^{(0)}, \ldots, x_{nx,B}^{(0)}, y_B^{(0)}, \alpha_B)$ as $$(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, y_B^{(0)}, \alpha_B);$$

g) computing a cipher point of the 0-th data block $(x_{0,c}^{(0)}, x_{1,c}^{(0)}, \ldots, x_{nx,c}^{(0)}, y_c^{(0)}, \alpha_c^{(0)})$ as:

$$(x_{0,c}^{(0)}, x_{1,c}^{(0)}, \ldots, x_{nx,c}^{(0)}, y_c^{(0)}, \alpha_c^{(0)}) = (x_{0,m}^{(0)}, x_{1,m}^{(0)}, \ldots, x_{nx,m}^{(0)}, y_m^{(0)}, \alpha_m^{(0)}) + (x_{0,kB}^{(0)}, x_{1,kB}^{(0)}, \ldots, x_{nx,kB}^{(0)}, y_{kB}^{(0)}, 1),$$

wherein $\alpha_c^{(0)} = \alpha_m^{(0)}$, and sending a set of appropriate bits of the x-coordinates and a bit indicating the value of $\alpha_c^{(0)}$ of the cipher point $(x_{0,c}^{(0)}, x_{1,c}^{(0)}, \ldots, x_{nx,c}^{(0)}, y_c^{(0)}, \alpha_c^{(0)})$ to the receiving correspondent;

h) establishing integers j and u, such that j=1, . . . , u, and initializing the integer j as j=1 and repeating the following steps i) to m), and incrementing j at each step until all of the message data blocks are processed:

i) generating a random number $kp_j$ with the random number generator based upon $kp_{j-1}$;

j) generating at least a portion of the coefficients $b_{1l}^{(j)}, b_{2lk}^{(j)} \in F$ of the j-th elliptic polynomial from the random number $kp_j$;

k) embedding the j-th block of the message bit string into a j-th elliptic polynomial message point $(x_{0,m}^{(j)}, x_{1,m}^{(j)}, \ldots, x_{nx,m}^{(j)}, y_m^{(j)}, \alpha_m^{(j)})$ using the data embedding method;

l) hopping the scalar multiplication point $(x_{0,kB}^{(j-1)}, x_{1,kB}^{(j-1)}, \ldots, x_{nx,kB}^{(j-1)}, y_{kB}^{(j-1)}, \alpha_{kB}^{(j-1)})$ to an equivalent message authentication code point $(x_{0,kB}^{(j)}, x_{1,kB}^{(j)}, \ldots, x_{nx,kB}^{(j)}, y_{kB}^{(j)}, \alpha_{kB}^{(j)})$ that satisfies the j-th elliptic polynomial of step j) using the data embedding method;

m) computing the cipher point of the j-th data block $(x_{0,c}^{(j)}, x_{1,c}^{(j)}, \ldots, x_{nx,c}^{(j)}, y_c^{(j)}, \alpha_c^{(j)})$ as:

$$(x_{0,c}^{(j)}, x_{1,c}^{(j)}, \ldots, x_{nx,c}^{(j)}, y_c^{(j)}, \alpha_c^{(j)}) = (x_{0,m}^{(j)}, x_{1,m}^{(j)}, \ldots, x_{nx,m}^{(j)}, y_m^{(j)}, \alpha_m^{(j)}) + (x_{0,kB}^{(j)}, x_{kB}^{(j)}, \ldots, x_{nx,kB}^{(j)}, y_{kB}^{(j)}, \alpha_{kB}^{(j)});$$

n) appropriate bits of the x-coordinates and a bit indicating the value of $\alpha_c^{(j)}$ of the cipher point $(x_{0,c}^{(u)}, x_{1,c}^{(u)}, \ldots, x_{nx,c}^{(u)}, y_c^{(u)}, \alpha_c^{(u)})$ being sent to the receiving correspondent;

the receiving correspondent then performs the following steps:

o) generating at least a portion of the coefficients $b_{1l}^{(0)}, b_{2lk}^{(0)} \in F$ of an initial elliptic polynomial to be used for the message authentication code of the 0-th message block from the shared secret key $kp_0$;

p) embedding the set of (nx+1) numbers $xb_i \in F$ into an elliptic polynomial point to obtain an initial base point $(x_{0,B}^{(0)}, x_{1,B}^{(0)}, \ldots, x_{nx,B}^{(0)}, y_B^{(0)}, \alpha_B)$ using the data embedding method;

q) computing the scalar multiplication of the 0-th block shared key $k_0$ with the base point $(x_{0,B}^{(0)}, x_{1,B}^{(0)}, \ldots, x_{nx,B}^{(0)}, y_B^{(0)}, \alpha_B)$ as $$(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B);$$

r) computing the message point of the 0-th data block $(x_{0,m}^{(0)}, x_{1,m}^{(0)}, \ldots, x_{nx,m}^{(0)}, y_m^{(0)}, \alpha_m^{(0)})$ as:

$$(x_{0,m}^{(0)}, x_{1,m}^{(0)}, \ldots, x_{nx,m}^{(0)}, y_m^{(0)}, \alpha_m^{(0)}) = (x_{0,c}^{(0)}, x_{1,c}^{(0)}, \ldots, x_{nx,c}^{(0)}, y_c^{(0)}, \alpha_c^{(0)}) - (x_{0,kB}^{(0)}, \ldots, x_{nx,kB}^{(0)}, y_{kB}^{(0)}, 1),$$

wherein $\alpha_m^{(0)} = \alpha_c^{(0)}$, and recovering the secret message bit string for the 0-th block from appropriate x-coordinates of the message point $(x_{0,m}^{(0)}, x_{1,m}^{(0)}, \ldots, x_{nx,m}^{(0)}, y_m^{(0)}, \alpha_m^{(0)})$ if $\alpha_m^{(0)} = 1$, and recovering the secret message bit string from a point $(gx_{0,m}^{(0)}, gx_{1,m}^{(0)}, \ldots, gx_{nx,m}^{(0)}, \sqrt{g^3} y_m^{(0)}, \alpha_m^{(0)})$ if $\alpha_m^{(j)} = g$;

s) initializing the integer j as j=1 and repeating the following steps t) to (x), and incrementing j at each step until all of the message data blocks are processed:

t) generating a random number $kp_j$ with the random number generator based upon $kp_{j-1}$;

u) generating at least a portion of the coefficients $b_{1l}^{(j)}, b_{2lk}^{(j)} \in F$ of the j-th elliptic polynomial from the random number $kp_j$;

v) hopping the scalar multiplication point $(x_{0,kB}^{(j-1)}, x_{1,kB}^{(j-1)}, \ldots, x_{nx,kB}^{(j-1)}, y_{kB}^{(j-1)}, \alpha_{kB}^{(j-1)})$ to an equivalent message authentication point $(x_{0,kB}^{(j)}, x_{1,kB}^{(j)}, \ldots, x_{1,kB}^{(j)}, y_{kB}^{(j)}, \alpha_{kB}^{(j)})$ that satisfies the j-th elliptic polynomial selected in step u) using the data embedding method;

w) computing the message point of the j-th received data block $(x_{0,m}^{(j)}, x_{1,m}^{(j)}, \ldots, x_{nx,m}^{(j)}, y_m^{(j)}, \alpha_m^{(j)})$ is computed as:

$$(x_{0,m}^{(j)}, x_{1,m}^{(j)}, \ldots, x_{nx,m}^{(j)}, y_m^{(j)}, \alpha_m^{(j)}) = (x_{0,c}^{(j)}, x_{1,c}^{(j)}, \ldots, x_{nx,c}^{(j)}, y_c^{(j)}, \alpha_c^{(j)}) - (x_{0,kB}^{(j)}, x_{1,kB}^{(j)}, \ldots, x_{nx,B}^{(j)}, y_{kB}^{(j)}, \alpha_{kB}^{(j)}),$$

wherein $\alpha_m^{(j)} = \alpha_c^{(j)}$; and x) recovering the secret message bit string for the j-th block from appropriate x-coordinates of the message point $(x_{0,m}^{(j)}, x_{1,m}^{(j)}, \ldots, x_{nx,m}^{(j)}, y_m^{(j)}, \alpha_m^{(j)})$ if $\alpha_m^{(j)} = 1$, and recovering the secret message bit string from the point $(gx_{0,m}^{(j)}, gx_{1,m}^{(j)}, \ldots, gx_{nx,m}^{(j)}, \sqrt{g^3} y_m^{(j)}, \alpha_m^{(j)})$ if $\alpha_m^{(j)} = g$.

In an alternative embodiment of the encryption method, the underlying finite field, the number of x-coordinates and the monomials used are selected from a predefined set of elliptic polynomial equation that are agreed upon between the corresponding entities.

The primary condition is that the ciphertext size must be the same as the block size. The ciphertext block size is determined by the maximum block size defined by the selected elliptic polynomial equations. If certain elliptic equations result in ciphertext block sizes that are smaller than the specified size of the ciphertext, then padding is used to maintain uniform block size. The alternative method includes the steps of:

a) defining a maximum block size that can be embedded into $(nx+1)$ x-coordinates and $ny$ y-coordinates, wherein $n$ is an integer, and setting the maximum block size to be $(nx+ny+1)N$ bits, wherein $N$ is an integer;

b) a sending correspondent and a receiving correspondent agree upon the values of $nx$ and $ny$, and further agree on a set of coefficients $a,b \in F$, wherein F represents a finite field where the field's elements can be represented in N-bits, the sending and receiving correspondents further agreeing upon a random number $k_0$, which is at least part of a shared secret key for communication, a random number generator, a random number $kp_0$ that is a portion of the shared secret key used for communication, and a set of $(nx+1)$ numbers such that $xb_i \in F$, wherein $i$ and $nx$ are integers, wherein $i=nx$, the set being used to find an initial base point, the set being made public;

the sending correspondent then performs the following steps:

c) selecting an elliptic polynomial form from the agreed upon set of general form equations using the shared secret key of the initial block, which is denoted as the 0-th block, and generating at least a portion of a set of coefficients $b_{1l}^{(0)}$, $b_{2lk}^{(0)} \in F$ of the first elliptic polynomial to be used for a message authentication code of the 0-th message block from the shared secret key $kp_0$;

d) embedding the set of $(nx+1)$ numbers $xb_i \in F$ into an elliptic polynomial point to obtain an initial base point $(x_{0,B}^{(o)}, x_{1,B}^{(0)}, \ldots, x_{nx,B}^{(0)}, y_B^{(0)}, \alpha_B)$ using a data embedding method;

e) embedding the 0-th block of the message bit string into an elliptic polynomial message point $(x_{0,m}^{(0)}, x_{1,m}^{(0)}, \ldots, x_{nx,m}^{(0)}, y_m^{(0)}, \alpha_m^{(0)})$ using the data embedding method;

f) computing a scalar multiplication of the 0-th block shared key $k_0$ with the base point $(x_{0,B}^{(0)}, x_{1,B}^{(0)}, \ldots, x_{nx,B}^{(0)}, y_B^{(0)}, \alpha_B)$ as $$(x_{0,kB}^{(0)}, x_{1,kB}^{(0)}, \ldots, x_{nx,B}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B);$$

g) computing a cipher point of the 0-th data block $(x_{0,c}^{(0)}, x_{1,c}^{(0)}, \ldots, x_{nx,c}^{(0)}, y_c^{(0)}, \alpha_c^{(0)})$ as:

$$(x_{0,c}^{(0)}, x_{1,c}^{(0)}, \ldots, x_{nx,c}^{(0)}, y_c^{(0)}, \alpha_c^{(0)}) = (x_{0,m}^{(0)}, x_{1,m}^{(0)}, \ldots, x_{nx,m}^{(0)}, y_m^{(0)}, \alpha_m^{(0)}) + (x_{0,kB}^{(0)}, x_{1,kB}^{(0)}, \ldots, x_{nx,kB}^{(0)}, y_{kB}^{(0)}, 1),$$

wherein $\alpha_c^{(0)} = \alpha_m^{(0)}$, and sending a set of appropriate bits of the x-coordinates and a bit indicating the value of $\alpha_c^{(0)}$ of the cipher point $(x_{0,c}^{(0)}, x_{1,c}^{(0)}, \ldots, x_{nx,c}^{(0)}, y_c^{(0)}, \alpha_c^{(0)})$ to the receiving correspondent;

h) establishing integers $j$ and $u$, such that $j=1, \ldots, u$, and initializing the integer $j$ as $j=1$ and repeating the following steps i) to m), and incrementing $j$ at each step until all of the message data blocks are processed:

i) generating a random number $kp_i$ with the random number generator based upon $kp_{j-1}$, and selecting an elliptic polynomial form from the agreed upon set of general form equations using the shared secret key of the j-th block;

j) generating at least a portion of the coefficients $b_{1l}^{(j)}$, $b_{2lk}^{(j)} \in F$ of the j-th elliptic polynomial from the random number $kp_j$;

k) embedding the j-th block of the message bit string into a j-th elliptic polynomial message point $(x_{0,m}^{(j)}, x_{1,m}^{(j)}, \ldots, x_{nx,m}^{(j)}, y_m^{(j)}, \alpha_m^{(j)})$ using the data embedding method;

l) hopping the scalar multiplication point $(x_{0,kB}^{(j-1)}, x_{1,kB}^{(j-1)}, \ldots, x_{nx,kB}^{(j-1)}, y_{kB}^{(j-1)}, \alpha_{kB}^{(j-1)})$ to an equivalent message authentication code point $(x_{0,kB}^{(j)}, x_{1,kB}^{(j)}, \ldots, x_{nx,kB}^{(j)}, y_{kB}^{(j)}, \alpha_{kB}^{(j)})$ that satisfies the j-th elliptic polynomial of step j) using the data embedding method;

m) computing the cipher point of the j-th data block $(x_{0,c}^{(j)}, x_{1,c}^{(j)}, \ldots, x_{nx,c}^{(j)}, y_c^{(j)}, \alpha_c^{(j)})$ as:

$$(x_{0,c}^{(j)}, x_{1,c}^{(j)}, \ldots, x_{nx,c}^{(j)}, y_c^{(j)}, \alpha_c^{(j)}) = (x_{0,m}^{(j)}, x_{1,m}^{(j)}, \ldots, x_{nx,m}^{(j)}, y_m^{(j)}, \alpha_m^{(j)}) + (x_{0,kB}^{(j)}, x_{1,kB}^{(j)}, \ldots, x_{nx,kB}^{(j)}, y_{kB}^{(j)}, \alpha_{kB}^{(j)});$$

n) appropriate bits of the x-coordinates and a bit indicating the value of $\alpha_c^{(j)}$ of the cipher point $(x_{0,c}^{(u)}, x_{1,c}^{(u)}, \ldots, x_{nx,c}^{(u)}, y_c^{(j)}, \alpha_c^{(j)})$ being sent to the receiving correspondent;

the receiving correspondent then performs the following steps:

o) selecting an elliptic polynomial form from the agreed upon set of general form equations using the shared secret key of the initial block and generating at least a portion of the coefficients $b_{1l}^{(0)}, b_{2lk}^{(0)} \in F$ of an initial elliptic polynomial to be used for the message authentication code of the 0-th message block from the shared secret key $kp_0$;

p) embedding the set of $(nx+1)$ numbers $xb_i \in F$ into an elliptic polynomial point to obtain an initial base point $(x_{0,B}^{(0)}, x_{1,B}^{(0)}, \ldots, x_{nx,B}^{(0)}, y_B^{(0)}, \alpha_B)$ using the data embedding method;

q) computing the scalar multiplication of the 0-th block shared key $k_0$ with the basepoint $(x_{0,B}^{(0)}, x_{1,B}^{(0)}, \ldots, x_{nx,B}^{(0)}, y_B^{(0)}, \alpha_B)$ as $$(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B);$$

r) computing the message point of the 0-th data block $(x_{0,m}^{(0)}, x_{1,m}^{(0)}, \ldots, x_{nx,m}^{(0)}, y_m^{(0)}, \alpha_m^{(0)})$ as:

$$(x_{0,m}^{(0)}, x_{1,m}^{(0)}, \ldots, x_{nx,m}^{(0)}, y_m^{(0)}, \alpha_m^{(0)}) = (x_{0,c}^{(0)}, x_{1,c}^{(0)}, \ldots, x_{nx,c}^{(0)}, y_c^{(0)}, \alpha_c^{(0)}) - (x_{0,kB}^{(0)}, x_{1,kB}^{(0)}, \ldots, x_{nx,kB}^{(0)}, y_{kB}^{(0)}, 1),$$

wherein $\alpha_m^{(0)} = \alpha_c^{(0)}$, and recovering the secret message bit string for the 0-th block from appropriate x-coordinates of the message point) $(x_{0,m}^{(0)}, x_{1,m}^{(0)}, \ldots, x_{nx,m}^{(0)}, y_m^{(0)}, \alpha_m^{(0)})$ if $\alpha_m^{(0)}=1$, and recovering the secret message bit string from a point $(gx_{0,m}^{(0)}, gx_{1,m}^{(0)}, \ldots, gx_{nx,m}^{(0)}, \sqrt{g^3}y_m^{(0)}, \alpha_m^{(0)})$ if $\alpha_m^{(j)}=g$;

s) initializing the integer j as $j=1$ and repeating the following steps t) to (x), and incrementing/at each step until all of the message data blocks are processed:

t) generating a random number $kp_j$ with the random number generator based upon $kp_{j-1}$;

u) generating at least a portion of the coefficients $b_{1l}^{(j)}$, $b_{2lk}^{(j)} \in F$ of the j-th elliptic polynomial from the random number $kp_j$, and selecting an elliptic polynomial form from the agreed upon set of general form equations using the shared secret key of the j-th block;

v) hopping the scalar multiplication point $(x_{0,kB}^{(j-1)}, x_{1,kB}^{(j-1)}, \ldots, x_{nx,kB}^{(j-1)}, y_{kB}^{(j-1)}, \alpha_{kB}^{(j-1)})$ to an equivalent message authentication point $(x_{0,kB}^{(j)}, x_{1,kB}^{(j)}, \ldots, x_{nx,kB}^{(j)}, y_{kB}^{(j)}, \alpha_{kB}^{(j)})$ that satisfies the j-th elliptic polynomial selected in step u) using the data embedding method;

w) computing the message point of the j-th received data block $(x_{0,m}^{(j)}, x_{1,m}^{(j)}, \ldots, x_{nx,m}^{(j)}, y_m^{(j)}, \alpha_m^{(j)})$ is computed as:

$(x_{0,m}^{(j)}, x_{1,m}^{(j)}, \ldots, x_{nx,m}^{(j)}, y_m^{(j)}, \alpha_m^{(j)}) = (x_{0,c}^{(j)}, x_{1,c}^{(j)}, \ldots, x_{nx,c}^{(j)}, y_c^{(j)}, \alpha_c^{(j)}) - (x_{0,kB}^{(j)}, x_{1,kB}^{(j)}, \ldots, x_{nx,kB}^{(j)}, y_{kB}^{(j)}, \alpha_{kB}^{(j)}),$ wherein $\alpha_m^{(j)} = \alpha_c^{(j)}$; and x) recovering the secret message bit string for the j-th block from appropriate x-coordinates of the message point $(x_{0,m}^{(j)}, x_{1,m}^{(j)}, \ldots, x_{nx,m}^{(j)}, y_m^{(j)}, \alpha_m^{(j)})$ if $\alpha_m^{(j)}=1$, and recovering the secret message bit string from the point $(gx_{0,m}^{(j)}, gx_{1,m}^{(j)}, \ldots, gx_{nx,m}^{(j)}, \sqrt{g^3}y_m^{(j)}, \alpha_m^{(j)})$ if $\alpha_m^{(j)}=g$.

As noted above, the methods include data embedding. In order to embed a message bit string into a point $(x, \sqrt{\alpha}y)$ which satisfies either an elliptic curve equation $y^2 = x^3 + \alpha x + b$ or its twist, $\bar{\alpha}y^2 = x^3 + \alpha x + b$, the message bit string is first divided into N-bit strings and the $l^{th}$ block is denoted as $m_i$. Following this, the value of the bit string of $m_i$ is assigned to $x_{m_i}$, and the values of $x_{m_i}$ are substituted and the value of $t_{m_i}$ is computed using $t_{m_i} = x_{m_i}^3 + \alpha x_{m_i} + b$.

If $t_{m_i}$ is quadratic residue, then $y_{m_i} = \sqrt{t_{m_i}}$ and the point is given as $(x_{m_i}, y_{m_i})$. However, if $t_{m_i}$ is non-quadratic residue, then $$y_{m_i} = \sqrt{\frac{t_{m_i}}{\bar{\alpha}}},$$

and the point is given as $(x_{m_i}, \sqrt{\bar{\alpha}}y_{m_i})$. The message point is then denoted as $(x_{m_i}, \sqrt{\alpha_{m_i}}y_{m_i})$, where the point is on the elliptic curve if $\alpha_{m_i}=1$, and the point is on the twist if $\alpha_{m_i}=\bar{\alpha}$.

Alternatively, data embedding may be performed as follows:

a) dividing the message bit string into (nx+ny+1) bit-strings $m_{x,0}, m_{x,1}, \ldots, m_{x,nx}, m_{y,1}, \ldots, m_{k,ny}$;

b) assigning the value of the bit string of $m_{x,0}, m_{x,1}, \ldots, m_{x,nx}$ to $x_{0,m}, x_{1,m}, \ldots, x_{nx,m}$;

c) assigning the value of the bit string of $m_{y,1}, \ldots, m_{k,ny}$ to $y_{1,m}, \ldots, y_{ny,m}$;

d) computing $$T^{(s-1)} = \sum_{l \in S_{nx}} b_{1l}x_l^3 + \sum_{l,k \in S_{nx}, l \neq k} b_{2lk}x_l^2 x_k;$$

and e) performing a Legendre test to determine if T has a square root, wherein if T has a square root, then assigning the square root to $y_0$, and if T does not have a square root, then the x-coordinates and y-coordinates of the elliptic curve point with the embedded shared secret key bit string are selected as $gx_{i,m}$ and $g^{3/2}y_{i,m}$, respectively, where g is non-quadratic residue in F.

As a hybrid of these techniques, the embedding may be performed as:

a) dividing the message bit string into N-bit strings, wherein the i-th block is given by $m_i$;

b) assigning the value of the bit string of $m_i$ to $x_{m_i}$;

c) substituting the values of $x_{m_i}$ and computing a residue value $t_{m_i}$ as $t_{m_i} = x_{m_i}^3 + \alpha x_{m_i} + b$, wherein if $t_{m_i}$ is quadratic residue such that $y_{m_i} = \sqrt{t_{m_i}}$, then the message point is embedded as $(x_{m_i}, y_{m_i})$, and if $t_{m_i}$ is non-quadratic residue such that $$y_{m_i} = \sqrt{\frac{t_{m_i}}{\bar{\alpha}}},$$

then the message point is embedded $(x_{m_i}, \sqrt{\bar{\alpha}}y_{m_i})$.

The Legendre Symbol is used to test whether an element of F(p) has a square root or not, i.e., whether an element is quadratic residue or not. The Legendre Symbol and test are as follows. Given an element of a finite field F(p), such as d, the Legendre symbol is defined as $$\left(\frac{d}{p}\right).$$

In order to test whether d is quadratic residue or not, the Legendre symbol, $$\left(\frac{d}{p}\right),$$

is computed such that $$\left(\frac{d}{p}\right) = \begin{cases} +1 & \text{if } x \text{ is quadratic residue} \\ 0 & \text{if } x \equiv 0 \bmod F(p) \\ -1 & \text{otherwise.} \end{cases}$$

In the above, the password protocols use the scalar multiplication $k_m(x_{Pu}, y_{Pu})$. It should be noted that, in order to find a collision means, that there are two message bits strings m and m' such that their integer values $k_m$ and $k_{m'}$ will lead to $k_m k(x_B, y_B) \equiv k_{m'} k(x_B, y_B)$. This collision implies that integers can be found such that $k_m k - k_{m'} k = l \ast \#EC$, where #EC is the order of the group (EC,+). This is equivalent to solving the elliptic polynomial discrete logarithm problem. This also applies to finding a collision for the points on the twist of an elliptic curve, $k_m k(x_{TB}, \sqrt{\bar{\alpha}}y_{TB}) = k_{m'} k(x_{TB}, \sqrt{\bar{\alpha}}y_{TB})$.

Thus, security of the password protocols depends on the security of the underlying elliptic polynomial cryptography. The security of elliptic curve cryptosystems is assessed by both the effect on the solution of the elliptic polynomial discrete logarithmic problem (ECDLP) and power analysis attacks.

It is well known that the elliptic polynomial discrete logarithm problem (ECDLP) is apparently intractable for non-singular elliptic curves. The ECDLP problem can be stated as follows: given an elliptic curve defined over F that needs N-bits for the representation of its elements, an elliptic curve point $(x_P, y_P) \in EC$, defined in affine coordinates, and a point $(x_Q, y_Q) \in EC$, defined in affine coordinates, determine the integer $k, 0 \leq k \leq \#F$, such that $(x_Q, y_Q) = k(x_P, y_P)$, provided that such an integer exists. In the below, it is assumed that such an integer exists.

The most well known attack used against the ECDLP is the Pollard p-method, which has a complexity of $O(\sqrt{\pi K}/2)$, where K is the order of the underlying group, and the complexity is measured in terms of an elliptic curve point addition.

Since the underlying cryptographic problems used in the above block cipher chaining methods is the discrete logarithm problem, which is a known difficult mathematical problem, it is expected that the security of the above methods are more secure than prior art ciphers which are not based on such a mathematically difficult problem.

Projective coordinate can also be used by the sending correspondent and the receiving correspondent to embed extra message data bits in the projective coordinate wherein the addition of the corresponding elliptic points is defined in (nx+ny+3) dimensional space where there are (nx+1) x-coordinates, (ny+1) y-coordinates and one projective coordinate.

The equations for the addition rule can be obtained by using the elliptic curve equation with (nx+1) x-coordinates and (nx+1) y-coordinates in projective coordinates and substituting a straight line equation to obtain a cubic equation in terms of one of the x-coordinates. This cubic equation can be used to identify the third point of intersection between a straight line and the elliptic curve in (nx+ny+3) dimensions given two other intersection points. This third point of intersection is used to identify the sum of the given two points.

It should be understood that the calculations may be performed by any suitable computer system, such as that diagrammatically shown in the sole drawing FIGURE. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

We claim:

1. A computerized method of performing elliptic polynomial cryptography with elliptic polynomial hopping, comprising the steps of:

a) defining a maximum block size that can be embedded into (nx+1) x-coordinates and ny y-coordinates, wherein n is an integer, and setting the maximum block size to be (nx+ny+1)N bits, wherein N is an integer;

b) a sending correspondent and a receiving correspondent agree upon the values of nx and ny, and further agree on a set of coefficients $a, b \in F$, wherein F represents a finite field where the field's elements can be represented in N-bits, the sending and receiving correspondents further agreeing upon a random number $k_0$, which is at least part of a shared secret key for communication, a random number generator, a random number $kp_0$ that is a portion of the shared secret key used for communication, and a set of (nx+1) numbers such that $xb_i \in F$, wherein i and nx are integers, wherein $i=0, \ldots, nx$, the set being used to find an initial base point, the set being made public;

the sending correspondent then performs the following steps:

c) generating at least a portion of a set of coefficients $b_{1l}^{(0)}, b_{2lk}^{(0)} \in F$ of a first elliptic polynomial to be used for a message authentication code of a 0-th message block from the shared secret key $kp_0$;

d) embedding the set of (nx+1) numbers $xb_i \in F$ into an elliptic polynomial point to obtain an initial base point $(x_{0,B}^{(0)}, x_{1,B}^{(0)}, \ldots, x_{nx,B}^{(0)}, y_B^{(0)}, \alpha_B)$ using a data embedding method;

e) embedding the 0-th block of the message bit string into an elliptic polynomial message point $(x_{0,m}^{(0)}, x_{1,m}^{(0)}, \ldots, x_{nx,m}^{(0)}, y_m^{(0)}, \alpha_m^{(0)})$ using the data embedding method;

f) computing a scalar multiplication of the 0-th block shared key $k_0$ with the base point $(x_{0,B}^{(0)}, x_{1,B}^{(0)}, \ldots, x_{nx,B}^{(0)}, y_B^{(0)}, \alpha_B)$ as $(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B)$;

g) computing a cipher point of the 0-th data block $(x_{0,c}^{(0)}, x_{1,c}^{(0)}, \ldots, x_{nx,c}^{(0)}, y_c^{(0)}, \alpha_c^{(0)})$ as:

$$(x_{0,c}^{(0)}, x_{1,c}^{(0)}, \ldots, x_{nx,c}^{(0)}, y_c^{(0)}, \alpha_c^{(0)}) = (x_{0,m}^{(0)}, x_{1,m}^{(0)}, \ldots, x_{nx,m}^{(0)}, y_m^{(0)}, \alpha_m^{(0)}) + (x_{0,kB}^{(0)}, x_{1,kB}^{(0)}, \ldots, x_{nx,kB}^{(0)}, y_{kB}^{(0)}, 1),$$

wherein $\alpha_c^{(0)} = \alpha_m^{(0)}$, and sending a set of appropriate bits of the x-coordinates and a bit indicating the value of $\alpha_c^{(0)}$ of the cipher point $(x_{0,c}^{(0)}, x_{1,c}^{(0)}, \ldots, x_{nx,c}^{(0)}, y_c^{(0)}, \alpha_c^{(0)})$ to the receiving correspondent;

h) establishing integers j and u, such that $j=1, \ldots, u$, and initializing the integer j as $j=1$ and repeating the following steps i) to m), and incrementing j at each step until all of the message data blocks are processed:

i) generating a random number $kp_j$ with the random number generator based upon $kp_{j-1}$;

j) generating at least a portion of the coefficients $b_{1l}^{(j)}, b_{2lk}^{(j)} \in F$ of the j-th elliptic polynomial from the random number $kp_j$;

k) embedding the j-th block of the message bit string into a j-th elliptic polynomial message point $(x_{0,m}^{(j)}, x_{1,m}^{(j)}, \ldots, x_{nx,m}^{(j)}, y_m^{(j)}, \alpha_m^{(j)})$ using the data embedding method;

l) hopping the scalar multiplication point $(x_{0,kB}^{(j-1)}, x_{1,kB}^{(j-1)}, \ldots, x_{nx,kB}^{(j-1)}, y_{kB}^{(j-1)}, \alpha_{kB}^{(j-1)})$ to an equivalent message authentication code point $(x_{0,kB}^{(j)}, x_{1,kB}^{(j)}, \ldots, x_{nx,kB}^{(j)}, y_{kB}^{(j)}, \alpha_{kB}^{(j)})$ that satisfies the j-th elliptic polynomial of step j) using the data embedding method;

m) computing the cipher point of the j-th data block $(x_{0,c}^{(j)}, x_{1,c}^{(j)}, \ldots, x_{nx,c}^{(j)}, y_c^{(j)}, \alpha_c^{(j)})$ as:

$$(x_{0,c}^{(j)}, x_{1,c}^{(j)}, \ldots, x_{nx,c}^{(j)}, y_c^{(j)}, \alpha_c^{(j)}) = (x_{0,m}^{(j)}, x_{1,m}^{(j)}, \ldots, x_{nx,m}^{(j)}, y_m^{(j)}, \alpha_m^{(j)}) + (x_{0,kB}^{(j)}, x_{1,kB}^{(j)}, \ldots, x_{nx,kB}^{(j)}, y_{kB}^{(j)}, \alpha_{kB}^{(j)});$$

n) appropriate bits of the x-coordinates and a bit indicating the value of $\alpha_c^{(j)}$ of the cipher point $(x_{0,c}^{(u)}, x_{1,c}^{(u)}, \ldots, x_{nx,c}^{(u)}, y_c^{(u)}, \alpha_c^{(u)})$ being sent to the receiving correspondent;

the receiving correspondent then performs the following steps:

o) generating at least a portion of the coefficients $b_{1l}^{(0)}, b_{2lk}^{(0)} \in F$ of an initial elliptic polynomial to be used for the message authentication code of the 0-th message block from the shared secret key $kp_0$;

p) embedding the set of (nx+1) numbers $xb_i \in F$ into an elliptic polynomial point to obtain an initial base point $(x_{0,B}^{(0)}, x_{1,B}^{(0)}, \ldots, x_{nx,B}^{(0)}, y_B^{(0)}, \alpha_B)$ using the data embedding method;

q) computing the scalar multiplication of the 0-th block shared key $k_0$ with the base point $(x_{0,B}^{(0)}, x_{1,B}^{(0)}, \ldots,$ $x_{nx,B}^{(0)}, y_B^{(0)}, \alpha_B)$ as $(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B)$;

r) computing the message point of the 0-th data block $(x_{0,m}^{(0)}, x_{1,m}^{(0)}, \ldots, x_{nx,m}^{(0)}, y_m^{(0)}, \alpha_m^{(0)})$ as:

$$(x_{0,m}^{(0)}, x_{1,m}^{(0)}, \ldots, x_{nx,m}^{(0)}, y_m^{(0)}, \alpha_m^{(0)}) = (x_{0,c}^{(0)}, x_{1,c}^{(0)}, \ldots, x_{nx,c}^{(0)}, y_c^{(0)}, \alpha_c^{(0)}) - (x_{0,kB}^{(0)}, x_{1,kB}^{(0)}, \ldots, x_{nx,kB}^{(0)}, y_{kB}^{(0)}, 1),$$

wherein $\alpha_m^{(0)} = \alpha_c^{(0)}$, and recovering the secret message bit string for the 0-th block from appropriate x-coordinates of the message point $x_{0,m}^{(0)}, x_{1,m}^{(0)}, \ldots, x_{nx,m}^{(0)}, y_m^{(0)}, \alpha_m^{(0)})$ if $\alpha_m^{(0)} = 1$ and recovering the secret message bit string from a point $(gx_{0,m}^{(0)}, gx_{1,m}^{(0)}, \ldots, gx_{nx,m}^{(0)}, \sqrt{g^3} y_m^{(0)}, \alpha_m^{(0)})$ if $\alpha_m^{(j)} = g$;

s) initializing the integer j as j=1 and repeating the following steps t) to (x), and incrementing j at each step until all of the message data blocks are processed:

t) generating a random number $kp_j$ with the random number generator based upon $kp_{j-1}$;

u) generating at least a portion of the coefficients $b_{1l}^{(j)}, b_{2lk}^{(j)} \in F$ of the j-th elliptic polynomial from the random number $kp_j$;

v) hopping the scalar multiplication point $(x_{0,kB}^{(j-1)}, x_{1,kB}^{(j-1)}, \ldots, x_{nx,kB}^{(j-1)}, y_{kB}^{(j-1)}, \alpha_{kB}^{(j-1)})$ to an equivalent message authentication point $(x_{0,kB}^{(j)}, x_{1,kB}^{(j)}, \ldots, x_{nx,kB}^{(j)}, y_{kB}^{(j)}, \alpha_{kB}^{(j)})$ that satisfies the j-th elliptic polynomial selected in step u) using the data embedding method;

w) computing the message point of the j-th received data block $(x_{0,m}^{(j)}, x_{1,m}^{(j)}, \ldots, x_{nx,m}^{(j)}, y_m^{(j)}, \alpha_m^{(j)})$ is computed as:

$$(x_{0,m}^{(j)}, x_{1,m}^{(j)}, \ldots, x_{nx,m}^{(j)}, y_m^{(j)}, \alpha_m^{(j)}) = (x_{0,c}^{(j)}, x_{1,c}^{(j)}, \ldots, x_{nx,c}^{(j)}, y_c^{(j)}, \alpha_c^{(j)}) - (x_{0,kB}^{(j)}, x_{1,kB}^{(j)}, \ldots, x_{nx,kB}^{(j)}, y_{kB}^{(j)}, \alpha_{kB}^{(j)}),$$

wherein $\alpha_m^{(j)} = \alpha_c^{(j)}$; and x) recovering the secret message bit string for the j-th block from appropriate x-coordinates of the message point $(x_{0,m}^{(j)}, x_{1,m}^{(j)}, \ldots, x_{nx,m}^{(j)}, y_m^{(j)}, \alpha_m^{(j)})$ if $\alpha_m^{(j)} = 1$, and recovering the secret message bit string from the point $(gx_{0,m}^{(j)}, gx_{1,m}^{(j)}, \ldots, gx_{nx,m}^{(j)}, \sqrt{g^3} y_m^{(j)}, \alpha_m^{(j)})$ if $\alpha_m^{(j)} = g$.

2. The computerized method of performing elliptic polynomial cryptography with elliptic polynomial hopping as recited in claim 1, wherein the step of embedding includes the steps of:

a) dividing the message bit string into N-bit strings, wherein the i-th block is given by $m_i$;

b) assigning the value of the bit string of $m_i$ to $x_{m_i}$;

c) substituting the values of $x_{m_i}$ and computing a residue value $t_{m_i}$ as $t_{m_i} = x_{m_i}^3 + \alpha x_{m_i} + b$, wherein if $t_{m_i}$ is quadratic residue such that $y_{m_i} = \sqrt{t_{m_i}}$, then the message point is embedded as $(x_{m_i}, y_{m_i})$, and if $t_{m_i}$ is non-quadratic residue such that $$y_{m_i} = \sqrt{\frac{t_{m_i}}{\alpha}},$$

then the message point is embedded $(x_{m_i}, \sqrt{\alpha} y_{m_i})$.

3. A computer software product that includes a non-transitory storage medium readable by a processor, the non-transitory storage medium having stored thereon a set of instructions for performing elliptic polynomial cryptography with elliptic polynomial hopping, the instructions comprising:

a) a first sequence of instructions which, when executed by the processor, causes the processor to define a maximum block size that can be embedded into (nx+1) x-coordinates and ny y-coordinates, wherein n is an integer, and setting the maximum block size to be (nx+ny+1)N bits, wherein N is an integer;

b) a second sequence of instructions which, when executed by the processor, causes the processor to implement a sending correspondent and a receiving correspondent agreeing upon the values of nx and ny, and further agreeing on a set of coefficients a,b∈F, wherein F represents a finite field where the field's elements can be represented in N-bits;

c) a third sequence of instructions which, when executed by the processor, causes the processor to implement the sending and receiving correspondents agreeing upon a random number $k_0$, which is at least part of a shared secret key for communication, and further agreeing upon a random number generator, a random number $kp_0$ that is a portion of the shared secret key used for communication, and a set of (nx+1) numbers such that $xb_i \in F$, wherein i and nx are integers, wherein i=0, . . . , nx, the set being used to find an initial base point, the set being made public;

d) a fourth sequence of instructions which, when executed by the processor, causes the processor to generate at least a portion of a set of coefficients $b_{1l}^{(0)}, b_{2lk}^{(0)} \in F$ of a first elliptic polynomial to be used for a message authentication code of a 0-th message block from the shared secret key $kp_0$;

e) a fifth sequence of instructions which, when executed by the processor, causes the processor to embed the set of (nx+1) numbers $xb_i \in F$ into an elliptic polynomial point to obtain an initial base point $(x_{0,B}^{(0)}, x_{1,B}^{(0)}, \ldots, x_{nx,B}^{(0)}, y_B^{(0)}, \alpha_B)$ using a data embedding method;

f) a sixth sequence of instructions which, when executed by the processor, causes the processor to embed the 0-th block of the message bit string into an elliptic polynomial message point $(x_{0,m}^{(0)}, x_{1,m}^{(0)}, \ldots, x_{nx,m}^{(0)}, y_m^{(0)}, \alpha_m^{(0)})$ using the data embedding method;

g) a seventh sequence of instructions which, when executed by the processor, causes the processor to compute a scalar multiplication of the 0-th block shared key $k_0$ with the base point $(x_{0,B}^{(0)}, x_{1,B}^{(0)}, \ldots, x_{nx,B}^{(0)}, y_B^{(0)}, \alpha_B)$ as $(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B)$;

h) an eighth sequence of instructions which, when executed by the processor, causes the processor to compute a cipher point of the 0-th data block $(x_{0,c}^{(0)}, x_{1,c}^{(0)}, \ldots, x_{nx,c}^{(0)}, y_c^{(0)}, \alpha_c^{(0)})$ as:

$$(x_{0,c}^{(0)}, x_{1,c}^{(0)}, \ldots, x_{nx,c}^{(0)}, y_c^{(0)}, \alpha_c^{(0)}) = (x_{0,m}^{(0)}, x_{1,m}^{(0)}, \ldots, x_{nx,m}^{(0)}, y_m^{(0)}, \alpha_m^{(0)}) + (x_{0,kB}^{(0)}, x_{1,kB}^{(0)}, \ldots, x_{nx,kB}^{(0)}, y_{kB}^{(0)}, 1),$$

wherein $\alpha_c^{(0)} = \alpha_m^{(0)}$, and sending a set of appropriate bits of the x-coordinates and a bit indicating the value of $\alpha_c^{(0)}$ of the cipher point $(x_{0,c}^{(0)}, x_{1,c}^{(0)}, \ldots, x_{nx,c}^{(0)}, y_c^{(0)}, \alpha_c^{(0)})$ to the receiving correspondent;

i) a ninth sequence of instructions which, when executed by the processor, causes the processor to establish integers j and u, such that j=1, . . . , u, and initializing the integer j as j=1 and incrementing j at each step until all of the message data blocks are processed;

j) a tenth sequence of instructions which, when executed by the processor, causes the processor to generate a random number $kp_j$ with the random number generator based upon $kp_{j-1}$;

k) an eleventh sequence of instructions which, when executed by the processor, causes the processor to generate at least a portion of the coefficients $b_{1l}^{(j)}, b_{2lk}^{(j)} \in F$ of the j-th elliptic polynomial from the random number $kp_j$;

l) a twelfth sequence of instructions which, when executed by the processor, causes the processor to embed the j-th block of the message bit string into a j-th elliptic polynomial message point $(x_{0,m}^{(j)}, x_{1,m}^{(j)}, \ldots, x_{nx,m}^{(j)}, y_m^{(j)}, \alpha_m^{(j)})$ using the data embedding method;

m) a thirteenth sequence of instructions which, when executed by the processor, causes the processor to hop the scalar multiplication point $(x_{0,kB}^{(j-1)}, x_{1,kB}^{(j-1)}, \ldots, x_{nx,kB}^{(j-1)}, y_{kB}^{(j-1)}, \alpha_{kB}^{(j-1)})$ to an equivalent message authentication code point $(x_{0,kB}^{(j)}, x_{1,kB}^{(j)}, \ldots, x_{nx,kB}^{(j)}, y_{kB}^{(j)}, \alpha_{kB}^{(j)})$ that satisfies the j-th elliptic polynomial;

n) a fourteenth sequence of instructions which, when executed by the processor, causes the processor to compute the cipher point of the j-th data block $(x_{0,c}^{(j)}, x_{1,c}^{(j)}, \ldots, x_{nx,c}^{(j)}, y_c^{(j)}, \alpha_c^{(j)})$ as:

$$(x_{0,c}^{(j)}, x_{1,c}^{(j)}, \ldots, x_{nx,c}^{(j)}, y_c^{(j)}, \alpha_c^{(j)}) = (x_{0,m}^{(j)}, x_{1,m}^{(j)}, \ldots, x_{nx,m}^{(j)}, y_m^{(j)}, \alpha_m^{(j)}) + (x_{0,kB}^{(j)}, x_{1,kB}^{(j)}, \ldots, x_{nx,kB}^{(j)}, y_{kB}^{(j)}, \alpha_{kB}^{(j)});$$

o) a fifteenth sequence of instructions which, when executed by the processor, causes the processor to send appropriate bits of the x-coordinates and a bit indicating the value of $\alpha_c^{(j)}$ of the cipher point $(x_{0,c}^{(u)}, x_{1,c}^{(u)}, \ldots, x_{nx,c}^{(u)}, y_c^{(u)}, \alpha_c^{(u)})$ to the receiving correspondent;

p) a sixteenth sequence of instructions which, when executed by the processor, causes the processor to generate at least a portion of the coefficients $b_{1l}^{(0)}, b_{2lk}^{(0)} \in F$ of an initial elliptic polynomial to be used for the message authentication code of the 0-th message block from the shared secret key $kp_0$;

q) a seventeenth sequence of instructions which, when executed by the processor, causes the processor to embed the set of (nx+1) numbers $xb_i \in F$ into an elliptic polynomial point to obtain an initial base point $(x_{0,B}^{(0)}, x_{1,B}^{(0)}, \ldots, x_{nx,B}^{(0)}, y_B^{(0)}, \alpha_B)$ using the data embedding method;

r) an eighteenth sequence of instructions which, when executed by the processor, causes the processor to compute the scalar multiplication of the 0-th block shared key $k_0$ with the base point $(x_{0,B}^{(0)}, x_{1,B}^{(0)}, \ldots, x_{nx,B}^{(0)}, y_B^{(0)}, \alpha_B)$ as $(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \alpha_B)$;

s) a nineteenth sequence of instructions which, executed by the processor, causes the processor to compute the message point of the 0-th data block $(x_{0,m}^{(0)}, x_{1,m}^{(0)}, \ldots, x_{nx,m}^{(0)}, y_m^{(0)}, \alpha_m^{(0)})$ as:

$$(x_{0,m}^{(0)}, x_{1,m}^{(0)}, \ldots, x_{nx,m}^{(0)}, y_m^{(0)}, \alpha_m^{(0)}) = (x_{0,c}^{(0)}, x_{1,c}^{(0)}, \ldots, x_{nx,c}^{(0)}, y_c^{(0)}, \alpha_c^{(0)}) - (x_{0,kB}^{(0)}, x_{1,kB}^{(0)}, \ldots, x_{nx,kB}^{(0)}, y_{kB}^{(0)}, 1),$$

wherein $\alpha_m^{(0)} = \alpha_c^{(0)}$, and recovering the secret message bit string for the 0-th block from appropriate x-coordinates of the message point $(x_{0,m}^{(0)}, x_{1,m}^{(0)}, \ldots, x_{nx,m}^{(0)}, y_m^{(0)}, \alpha_m^{(0)})$ if $\alpha_m^{(0)} = 1$, and recovering the secret message bit string from a point $(gx_{0,m}^{(0)}, gx_{1,m}^{(0)}, \ldots, gx_{nx,m}^{(0)}, \sqrt{g^3} y_m^{(0)}, \alpha_m^{(0)})$ if $\alpha_m^{(j)} = g$;

t) a twentieth sequence of instructions which, when executed by the processor, causes the processor to initialize the integer j as j=1 and incrementing j at each step until all of the message data blocks are processed;

u) a twenty-first sequence of instructions which, when executed by the processor, causes the processor to generate a random number $kp_j$ with the random number generator based upon $kp_{j-1}$;

v) a twenty-second sequence of instructions which, when executed by the processor, causes the processor to generate at least a portion of the coefficients $b_{1l}^{(j)}, b_{2lk}^{(j)} \in F$ of the j-th elliptic polynomial from the random number $kp_j$;

w) a twenty-third sequence of instructions which, when executed by the processor, causes the processor to hop the scalar multiplication point $(x_{0,kB}^{(j-1)}, x_{1,kB}^{(j-1)}, \ldots, x_{nx,kB}^{(j-1)}, y_{kB}^{(j-1)}, \alpha_{kB}^{(j-1)})$ to an equivalent message authentication point $(x_{0,kB}^{(j)}, x_{1,kB}^{(j)}, \ldots, x_{nx,kB}^{(j)}, y_{kB}^{(j)}, \alpha_{kB}^{(j)})$ that satisfies the j-th elliptic polynomial;

x) a twenty-fourth sequence of instructions which, when executed by the processor, causes the processor to compute the message point of the j-th received data block $(x_{0,m}^{(j)}, x_{1,m}^{(j)}, \ldots, x_{nx,m}^{(j)}, y_m^{(j)}, \alpha_m^{(j)})$ as:

$$(x_{0,m}^{(j)}, x_{1,m}^{(j)}, \ldots, x_{nx,m}^{(j)}, y_m^{(j)}, \alpha_m^{(j)}) = (x_{0,c}^{(j)}, x_{1,c}^{(j)}, \ldots, x_{nx,c}^{(j)}, y_c^{(j)}, \alpha_c^{(j)}) - (x_{0,kB}^{(j)}, x_{1,kB}^{(j)}, \ldots, x_{nx,kB}^{(j)}, y_{kB}^{(j)}, \alpha_{kB}^{(j)}),$$

wherein $\alpha_m^{(j)} = \alpha_c^{(j)}$; and y) a twenty-fifth sequence of instructions which, when executed by the processor, causes the processor to recover the secret message bit string for the j-th block from appropriate x-coordinates of the message point $(x_{0,m}^{(j)}, x_{1,m}^{(j)}, \ldots, x_{nx,m}^{(j)}, y_m^{(j)}, \alpha_m^{(j)})$ if $\alpha_m^{(j)} = 1$, and recovering the secret message bit string from the point $(gx_{0,m}^{(j)}, gx_{1,m}^{(j)}, \ldots, gx_{nx,m}^{(j)}, \sqrt{g^3} y_m^{(j)}, \alpha_m^{(j)})$ if $a_m^{(j)} = g$.

* * * * *